United States Patent
Bordes et al.

(10) Patent No.: US 7,739,479 B2
(45) Date of Patent: Jun. 15, 2010

(54) METHOD FOR PROVIDING PHYSICS SIMULATION DATA

(75) Inventors: Jean Pierre Bordes, St. Charles, MO (US); Curtis Davis, St. Louis, MO (US); Monier Maher, St. Louis, MO (US); Manju Hegde, St. Louis, MO (US); Otto A. Schmid, Morgantown, WV (US)

(73) Assignee: NVIDIA Corporation, Santa Clara, CA (US)

( * ) Notice: Subject to any disclaimer, the term of this patent is extended or adjusted under 35 U.S.C. 154(b) by 540 days.

(21) Appl. No.: 10/715,370

(22) Filed: Nov. 19, 2003

(65) Prior Publication Data

US 2005/0075154 A1    Apr. 7, 2005

Related U.S. Application Data

(60) Provisional application No. 60/507,527, filed on Oct. 2, 2003.

(51) Int. Cl.
G06F 17/00 (2006.01)
G06F 15/16 (2006.01)
G06F 15/80 (2006.01)
G06F 9/00 (2006.01)

(52) U.S. Cl. ............ 712/1; 712/3; 712/7; 712/10; 712/22; 712/24; 712/28; 712/32; 712/34; 463/1; 345/502; 345/503; 345/505; 719/321; 719/328

(58) Field of Classification Search ........... 463/1, 463/43–47, 30–38, 2; 345/501–522, 473; 712/10, 16, 32, 1, 3, 7, 22, 28, 34, 35, 24; 711/147, 148; 703/1–2; 719/321–328; 718/1, 718/100; 710/22, 52
See application file for complete search history.

(56) References Cited

U.S. PATENT DOCUMENTS

| 4,887,235 A | 12/1989 | Holloway et al. |
| 4,933,846 A | 6/1990 | Humphrey et al. |
| 5,010,477 A | 4/1991 | Omoda et al. |
| 5,063,498 A | 11/1991 | Hirahara et al. |
| 5,123,095 A | 6/1992 | Papadopoulos et al. |
| 5,404,522 A | 4/1995 | Carmon et al. |
| 5,517,186 A | 5/1996 | Veenstra |

(Continued)

FOREIGN PATENT DOCUMENTS

JP    2006-107514    4/2006

(Continued)

OTHER PUBLICATIONS

Bishop, et al. "SPARTA: Simulation of Physics on a Real-Time Architecture," Proceedings of the 10$^{th}$ Great Lakes Symposium on VLSI, pp. 177-182, 2000. Intel Corp. "Intel PCI and PCI Express," 1992-2004.

(Continued)

*Primary Examiner*—Dmitry Suhol
*Assistant Examiner*—Damon J. Pierce
(74) *Attorney, Agent, or Firm*—Patterson & Sheridan, LLP

(57) ABSTRACT

A method of providing physics data within a game program or simulation using a hardware-based physics processing unit having unique architecture designed to efficiently calculate physics related data.

30 Claims, 16 Drawing Sheets

U.S. PATENT DOCUMENTS

| | | | |
|---|---|---|---|
| 5,577,250 | A | 11/1996 | Anderson et al. |
| 5,664,162 | A * | 9/1997 | Dye .................... 345/532 |
| 5,692,211 | A | 11/1997 | Gulick et al. |
| 5,721,834 | A * | 2/1998 | Milhaupt et al. ........... 710/100 |
| 5,732,224 | A | 3/1998 | Gulick et al. |
| 5,748,983 | A | 5/1998 | Gulick et al. |
| 5,765,022 | A * | 6/1998 | Kaiser et al. .................. 710/22 |
| 5,796,400 | A | 8/1998 | Atkinson et al. |
| 5,812,147 | A | 9/1998 | Van Hook et al. |
| 5,818,452 | A | 10/1998 | Atkinson et al. |
| 5,841,444 | A * | 11/1998 | Mun et al. ................. 345/506 |
| 5,870,627 | A | 2/1999 | O'Toole et al. |
| 5,892,691 | A | 4/1999 | Fowler |
| 5,898,892 | A | 4/1999 | Gulick et al. |
| 5,938,530 | A * | 8/1999 | Watanabe .................... 463/31 |
| 5,966,528 | A | 10/1999 | Wilkinson et al. |
| 6,058,465 | A | 5/2000 | Nguyen |
| 6,119,217 | A | 9/2000 | Suzuoki |
| 6,223,198 | B1 * | 4/2001 | Oberman et al. ............ 708/620 |
| 6,236,403 | B1 | 5/2001 | Chaki et al. |
| 6,317,819 | B1 | 11/2001 | Morton |
| 6,317,820 | B1 | 11/2001 | Shiell et al. |
| 6,324,623 | B1 * | 11/2001 | Carey ........................ 711/148 |
| 6,341,318 | B1 | 1/2002 | Dakhil |
| 6,342,892 | B1 | 1/2002 | Van Hook et al. |
| 6,366,998 | B1 | 4/2002 | Mohamed |
| 6,425,822 | B1 * | 7/2002 | Hayashida et al. ............. 463/7 |
| 6,526,491 | B2 | 2/2003 | Suzuoki et al. |
| 6,570,571 | B1 * | 5/2003 | Morozumi .................. 345/505 |
| 6,608,631 | B1 | 8/2003 | Milliron |
| 6,754,732 | B1 | 6/2004 | Dixon et al. |
| 6,779,049 | B2 | 8/2004 | Altman et al. |
| 6,862,026 | B2 | 3/2005 | Zachmann |
| 6,966,837 | B1 * | 11/2005 | Best ............................ 463/33 |
| 6,967,658 | B2 | 11/2005 | Hunter et al. |
| 7,058,750 | B1 | 6/2006 | Rankin et al. |
| 7,120,653 | B2 * | 10/2006 | Alfieri et al. ................ 707/204 |
| 7,149,875 | B2 | 12/2006 | Kirsch |
| 7,212,203 | B2 | 5/2007 | Payne |
| 7,236,170 | B2 | 6/2007 | Sepulveda |
| 7,421,303 | B2 | 9/2008 | Zhang et al. |
| 2001/0016883 | A1 | 8/2001 | Mino |
| 2002/0135583 | A1 | 9/2002 | Ohba |
| 2003/0179205 | A1 | 9/2003 | Smith et al. |
| 2004/0075623 | A1 * | 4/2004 | Hartman ..................... 345/1.3 |
| 2005/0041031 | A1 * | 2/2005 | Diard ......................... 345/505 |
| 2005/0086040 | A1 * | 4/2005 | Davis et al. ................... 703/22 |
| 2005/0120187 | A1 | 6/2005 | Suzuoki et al. |
| 2005/0251644 | A1 | 11/2005 | Maher et al. |
| 2007/0079018 | A1 | 4/2007 | Day et al. |
| 2007/0279422 | A1 | 12/2007 | Sugita et al. |

FOREIGN PATENT DOCUMENTS

| | | |
|---|---|---|
| JP | 2007-052790 | 3/2007 |

OTHER PUBLICATIONS

Telekinesys Research Ltd. "Havok Game Dynamics SDK," 2002.
Wakamatsu, et al. "Static Modeling of Linear Object Deformation Based on Differential Geometry": Sage Publications 2004.
Zhuang, et al. "Real-Time Simulation of Physically Realistic Global Deformation". 1999.
Hauth, et al. "Corotational Simulation of Deformable Solids." Journal of WSCG, vol. 12 No. 1-3; 2003.
Office Action, U.S. Appl. No. 10/715,440. Dated Feb. 23, 2009.
Office Action, U.S. Appl. No. 11/798,119. Dated Mar. 12, 2009.
Breen, et al., "A Level-Set Approach for the Metamorphosis of Solid Models," IEEE Transactions on Visualization and Computer Graphics, vol. 7, No. 2, pp. 173-192, Apr.-Jun. 2001.
Muller, et al., "Point Based Animation of Elastic, Plastic and Melting Objects," Eurographics/ACM SIGGRAPH Symposium on, Computer Animation (2004).
Milliron, et al. "A Framework for Geometric Warps and Deformation", ACM Transactions on Graphics, vol. 21, No. 1, Jan. 2002, pp. 20-51.
Muller, et al., "Real-Time Simulation of Deformation and Fracture of Stiff Materials," EUROGRAPHICS, Workshop on Animation and Simulation (2001).
Teschner, et al., "A Versatile and Robust Model for Geometrically Complex Deformable Solids," 2004.
Notice of Allowance, U.S. Appl. No. 11/346,299, dated Sep. 11, 2009.
Office Action, U.S. Appl. No. 10/839,155, dated Dec. 15, 2010.
Office Action, U.S. Appl. No. 10/715,459, dated Jan. 5, 2010.
Teitelbaum, K. "Crossbar tree networks for embedded signal processing applications", This paper appears in: Massively Parallel Processing, 1998. Proceedings. Fifth International Conference on; Publication Date: Jun. 15-17, 1998; On Pages: 200-207.

* cited by examiner

METHOD FOR PROVIDING PHYSICS SIMULATION DATA

This application claims the benefit of U.S. Provisional Application No. 60/507,527 filed Oct. 2, 2003

BACKGROUND OF THE INVENTION

The present invention relates generally to a hardware-based physics and animation processing unit finding application in interactive environments, for example, in the field of Personal Computer (PC) or console games.

Game players have a great appetite for sophisticated entertainment that accurately simulates reality. A high degree of computer animated realism requires lifelike interaction between game objects. For example, people intuitively understand that a ball reacts very differently when bouncing across a concrete surface as compared with a grassy surface. A lifelike digital simulation of the ball bouncing across these disparate surfaces must account for the different physical properties (friction, rigidity, etc.) of the respective surfaces, and their influence on the ball's animated motion. In addition, for interactive applications, the physics simulation must run in real-time. Within the contemporary personal computing (PC) environment, conventional processors running available software are capable of simulating and visually displaying only relatively simple physics-based interactions, such as a lifelike animation of a ball bouncing across a driveway and onto a lawn in real-time.

The conventional resources typically brought to bear on the problem of physics-based simulations are conceptually illustrated in FIG. 1. Within FIG. 1, resources primarily based in hardware are shown in solid outline while software resources are shown in dotted outline. Those of ordinary skill in the art will recognize that such hardware/software designations are relatively arbitrary. For example, computational logic may be fully implemented in software or hardwired into a logic device at a system designer's discretion. However, some logical distinction between hardware and software, as exemplified by current best practices, is useful in the description that follows.

In FIG. 1, a Central Processing Unit (CPU) 10, such as a Pentium® microprocessor, together with its associated drivers and internal memory, access data from an external memory 11, and/or one or more peripheral devices 13. The terms "internal" and "external" are used to generally differentiate between various memories in relation to the other computational components in a system. Such differentiation is clearly relative, since an internal memory can be turned into an external memory by removing the internal memory from a system, board, or chip containing related computational components and exporting it to another system, board, or chip. The converse is true for changing an external memory into an internal memory. Generally speaking, however, an internal memory will typically be co-located on the same chip as related computational component(s), while external memory will typically be implemented using a separate chip or chip set.

Most contemporary computer games include significant graphical content and are thus intended to run with the aid of separate Graphics Processing Unit (GPU) 12. GPUs are well know in the industry and are specifically designed to run in cooperation with a CPU to create, for example, animations having a three dimensional (3-D) quality.

Main game program 20 is resident in external memory 11 and/or peripheral 13 (e.g., a CD and/or floppy disk drive). Game assets, such as artist illustrations, are also routinely stored in external memory 11 and/or peripheral 13. Game program 20 uses various Application Programming Interfaces (APIs) to access blocks of specialty software associated with various program functions. An API is a well understood programming technique used to establish a lexicon of sorts by which one piece of software may "call" another piece of software. The term "call" as variously used hereafter broadly describes any interaction by which one piece of software causes the retrieval, storage, indexing, update, execution, etc., of another piece of software.

Data instructions, often in a prescribed packet form and referred to hereafter a "commands," are generally used to initiate calls between one or more software or hardware components. Execution (i.e., "running") of software, in any of its various forms including micro-code, occurs upon receipt of an appropriate command.

Typical software resources implementing contemporary computer games include game program 20 and GPU driver 23, each with an associated API. GPU driver 23 configures the hardware registers and memory associated with CPU 10 to effect bi-directional data communication (i.e., data or command transfer) between CPU 10 and GPU 12.

With the recent and growing appetite for realism, so-called physics engines have been added to the program code implementing PC games. Indeed, a market has recently emerged directed to the development of physics engines or so-called "physics middleware." Companies like HAVOK, MathEngine, Novodex and Meqon Research have developed specialty software that may be called by a game program to better incorporate natural looking, physics-based interactions into game play. Physics middleware applications may be called by game program 20 through an associated API. Conventional software based physics engines allow game programmers increased latitude to assign, for example, virtual mass and coefficients of friction to game objects. Similarly, virtual forces, impulses, and torques may be applied to game objects. In effect, software-based physics engines provide programmers with a library of procedures to simplify the visual creation of game scenes having physics-based interaction between game objects.

Unfortunately, such procedures remain fairly limited in both content and application. Simply put, the continuing appetite for game realism can not be met by merely providing additional specialty software, and thereby layering upon the CPU additional processing requirements. This is true regardless of the relative sophistication of the specialty software.

Contemporary software-based physics engines have significant limitations as to the number of objects in a game scene, and more particularly, the number of interacting objects. Realistic visual images of simulated physics interaction must account for constraints placed upon many or all of the game objects. A constraint is a restriction on the possible movement or interaction of an object (e.g., a contact, a door hinge, a knee joint, a dog on a leash). Increasing complexity of terrain geometry greatly increases the difficulty of simulating object interactions with the terrain. The complexity of collision detection and resolution also increases with the complexity of an object's surface geometry (i.e., its surface detail). When depicting clothing on a character, for example, the frequent collision between the character and the clothing needs to be modeled. When portraying agitated bodies of water, the wake of boats, surface foam, swirling water, waves, as examples, must to be modeled and simulated.

Along with an increasing number of active game objects, cutting edge computer games demand an increased number of forces being applied to the objects. These aggregate demands are further aggravated by the increasing number of "time steps" per second being used in PC games, (i.e., the frequency with which the animated world with all its objects and forces is updated in real time).

All of the foregoing, when resolved by specialty software, place enormous additional demands upon the already over-burdened CPU. The CPU time spent processing the numbers required to implement physics effects further reduces the amount of CPU time available for other game play requirements like graphics processing and communications. Indeed, the primary source of limitation upon the realization of software-based physics simulations is the CPU architecture itself. General purpose CPUs, like Pentium, are simply not designed to provide real-time physics simulation data.

Conventional CPUs lack the numerous parallel execution units needed to run complex, real-time physics simulations. The data bandwidth provided between the CPU and external memory is too limited and data latency is too high. Data pipeline flushes are too frequent. Data caches are too small and their set-associative nature further limits the amount of them that is utilizable. CPUs have too few registers. CPUs lack specialized instructions (e.g., cross product, dot product, vector normalization). In sum, the general purpose architecture and instruction set associated with conventional CPUs are insufficient to run complex, real-time physics simulations.

The limitations inherent in a general purpose CPU running conventional, software-based physics engines are readily manifest when one considers a typical resolution cycle for a rigid body simulation. The exemplary resolution cycle 9 illustrated in FIG. 2 consists of a sequence of eight functions. Each function must be repeated by the software-based physics engine one per time-step, typically 60 per second, for each active object in an animation.

Within the exemplary resolution cycle 9 shown in FIG. 2, broad phase collision detection (9a) is followed by narrow phase collision detection (9b), contact generation (9c), island generation (9d), force solver (9e), numerical integration (9f), and resolution of fast moving objects (9g) before state updates are communicated to the game program, game engine, and/or CPU. The functions are executed largely, if not entirely, in sequence since many functions are dependent on the results computed by one or more previous functions.

The final step in the resolution cycle, labeled "Updates to/from application" (9h), results in bi-directional communication between the software-based physics engine and one or more application processes controlling it and/or using its data results (hereafter generally referred to as "the controlling/requesting application"). In some situations, however, bi-directional communication between an controlling/requesting application and the physics engine is required between function steps in the resolution cycle, for example, between steps 9b, "Narrow Phase Collision Detection," and 9c, "Contact Generation,"

When the physics engine software is running on the same device (i.e., CPU) as the controlling/requesting application, as is the case for a conventional software-based physics engine, this communication process is relatively straightforward. The controlling/requesting application simply calls in sequence each functional component of the resolution cycle. Between function calls, the application can directly access simulation data structures, which are resident in either internal memory or external memory, make additional function calls to the physics engine API, or communicate data externally.

While straightforward, this approach to complex rigid body simulations is limited. The sequentially calculated and functionally interdependent nature of the physics simulation data obtained by the conventional resolution cycle is ill-suited to a realistic visual display of numerous, high-quality game objects with their associated forces. More and more CPU processing time is required to calculate data related to the physics interaction of rigid bodies in the game.

While the foregoing example has been drawn to rigid body simulations, other types of physical simulation, like cloth, particles, and/or fluid simulations, have a similar structure and flow between functional components. Such simulations also conventionally require once per step-time communication between the software physics engine implementing the physics simulation and the controlling/requesting application.

So, in addition to the noted deficiencies with general purpose CPUs and their associated memory system architectures and capabilities, the current PC based game environment is ill suited to the efficient calculation of physics simulation data and the communication of this data between applications.

SUMMARY OF THE INVENTION

The digital calculation of physics simulation data involves a considerable quantity of mathematical procedures referred to as "floating point" operations. Ideally, the great multiplicity of floating point operations required to calculate physics simulation data would done efficiently and at a greatly reduced price point over the conventional, software-based practice. That is, a maximum number of floating point operations per unit cost is highly desired.

However, the efficient calculation of floating point data in and of itself is not enough. Once calculated, the physics simulation data must be efficiently communicated from the calculation means to the host device (e.g., a PC or game console with its associated applications). Thus, a well conceived architecture is required that incorporates the specialized hardware resources and data transfer mechanisms required to efficiently calculate physics simulation data and communicate it to the host. In other words, the architecture must provide not only increased floating point operations, but also the right mix of floating point operations capability and data throughput. It must also avoid data stalls, and long latency periods during which data is loaded and unloaded from the circuitry executing the floating point operations.

Thus, in one aspect, the present invention provides a game system comprising a Central Processing Unit (CPU) operatively connected to an external memory, one or more peripherals, and a Physics Processing Unit (PPU). The PPU is preferably a separate chip designed to efficiently provide physics simulation data and communicate this data to the CPU. The PPU may be viewed in this aspect much like a Graphics Processing Unit (GPU). GPUs are typically separate co-processors designed to efficiently render graphics data from a CPU. In a related aspect, the present invention fully contemplates the combination of a PPU with a GPU within a game system. This combination of PPU and GPU may take the form of two chips on a single board or a single chip implementing both PPU and GPU functionality.

In another aspect of the present invention, the PPU is flexibly designed to communicate with the CPU (or host device generally) via one or more conventional physical interfaces, such as USB, USB2, Firewire, PCI, PCI-X, PCI-Express, and Ethernet (e.g., 10/100 Ethernet, Gigabit Ethernet).

Good use of APIs and a dedicated PPU driver will further enhance the utility of the PPU within the game system. Where a main game program and PPU driver are co-resident in a host, program calls are efficient.

In a more detailed and exemplary aspect of the present invention, the PPU includes a PPU Control Engine (PCE)

controlling the operation of the PPU and communication of physics simulation data with the host. The PPU also includes a Data Movement Engine (DME) responsive to commands received from the PCE and executing programs adapted to perform data movement operations. The PPU also includes a Floating Point Engine (FPE), responsive to commands from the DME and executing floating point calculations. A high-speed data bus is preferably provided to connect a high-speed memory to the DME and FPE.

The currently contemplated FPE includes a plurality of floating point execution units selectively grouped together to form a parallel vector floating point unit. In a related aspect, the FPE performs floating point operations in response to a Very Long Instruction Word (VLIW).

In another aspect, the present invention provides a method of incorporating physics simulation data into a game running on a host. The method is characterized by running a main game program on the host and calling a PPU driver from the main game program. By means of the PPU driver, operation of the PPU is initiated and physics simulation data is calculated. Once calculated, the physics simulation date is communicated from the PPU to the host.

In each of the foregoing aspects, a multi-thread or ultra-threading processing and data movement technique is preferably used to maximize efficiency of the FPE.

The present invention finds present and particular application in the field of PC or console based games. However, it is not limited to such game systems. Any application benefiting from the incorporation of physics simulation data is susceptible to the benefits of the present invention.

Thus, in another aspect, the present invention provides a hardware-based PPU connected to a host CPU via a physical interface. The stand alone (i.e., separate chip) PPU comprises the PCE, DME, and FPE and is described in the exemplary embodiment that follows.

The PPU may further comprise an internal memory operatively connected to the DME, and a high-speed memory bus operatively connecting an external, high-speed memory with the DME and FPE. The internal memory preferably comprises multiple banks allowing multiple data threading operations under the control of the PCE and DME.

The detailed description and related drawings that follow set forth a presently preferred embodiment with its multiple and variously related aspects. A primary purpose for this written description is the presentation of an example illustrating the making and use of a more general and broadly applicable invention. The claims that follow define the scope of the present invention.

BRIEF DESCRIPTION OF THE DRAWINGS

In the drawings, like reference characters indicate like elements. The drawings, taken together with the foregoing discussion, the detailed description that follows, and the claims, describe a preferred embodiment of the present invention. The drawings include the following:

DETAILED DESCRIPTION OF THE PREFERRED EMBODIMENT(S)

The present invention recognizes that conventional software-based solutions to physics simulations have limits that affect their practical application. For example, next generation games would benefit considerably by including many more active objects and related forces than could be reasonably simulated using specialty software run on a general purpose CPU.

Thus, the present invention approaches the problem of generating visually realistic physics interactions between animated objects from an entirely different perspective. Unlike conventional software-based solutions, the present invention proposes a hardware-based Physics Processing Unit (PPU). A PPU implemented in accordance with the dictates of the present invention may be viewed in one aspect as a specialty co-processor. In cooperation with a general purpose CPU, the PPU provides the enormous, additional, and highly specialized processing capabilities required to implement complex, real-time, physics effects in next generation games.

Figure 3:
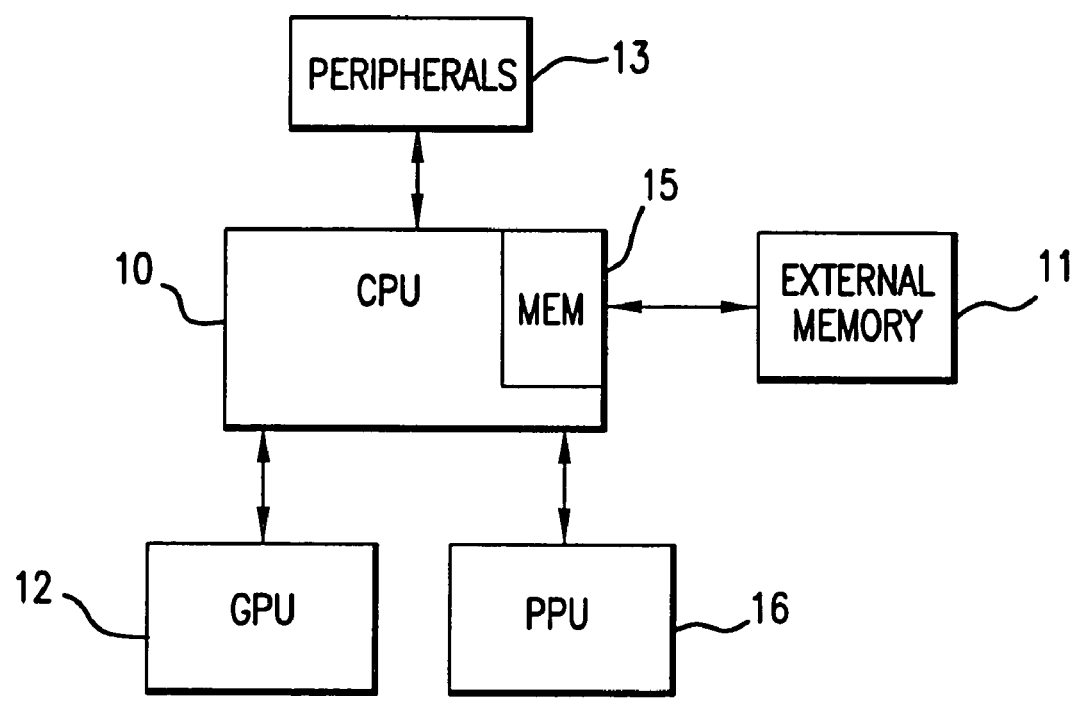
FIG. 3 is a conceptual block diagram showing the principal hardware components forming a game system according to the present invention.

From a hardware perspective, a PPU may be incorporated into the conventional PC environment as conceptually shown in FIG. 3. CPU 10 having internal memory cache(s) 15 is connected to external memory 1, one or more peripherals 13, and Graphics Processing Unit (GPU) 12. Additionally, CPU 10 is connected to PPU 16.

Figure 4:
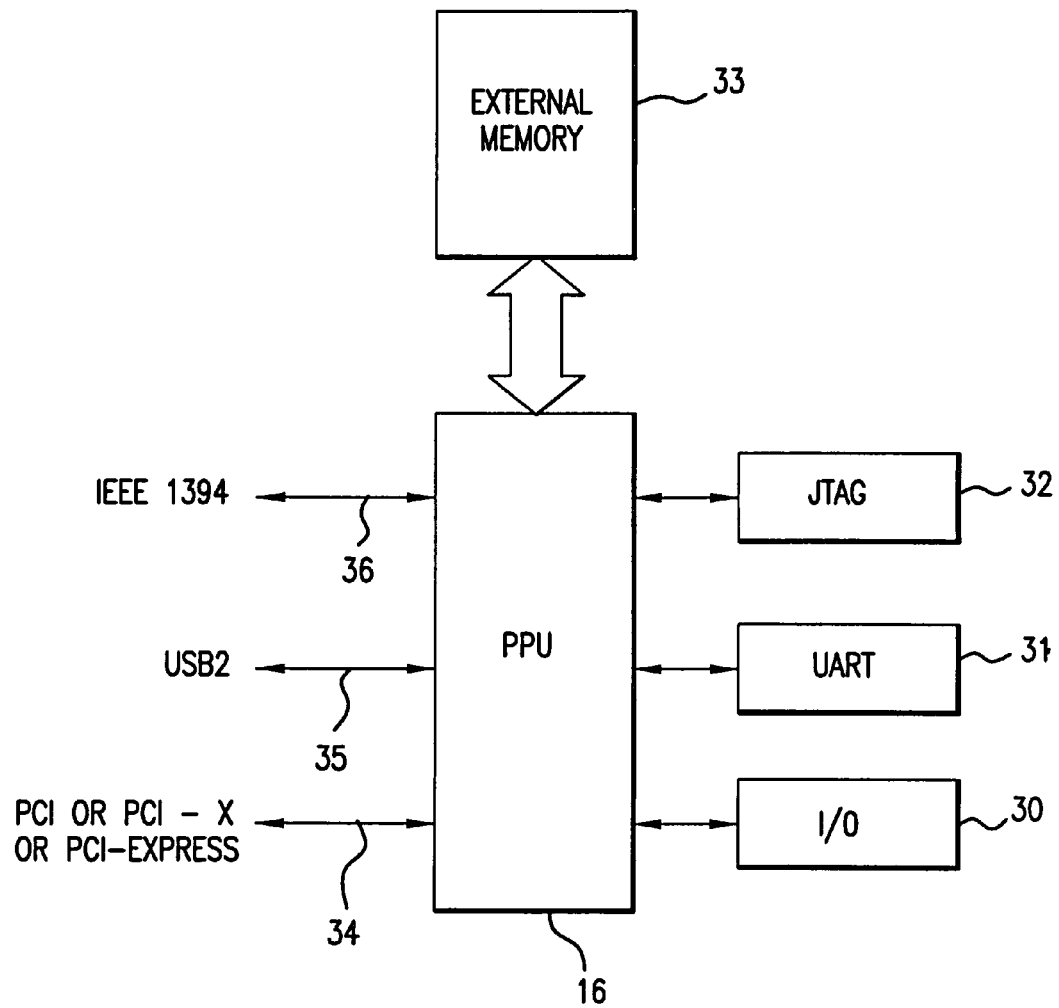
FIG. 4 further illustrates selected physical interfaces to the PPU of FIG. 3.

Exemplary interconnections to PPU 16 are shown in further detail in FIG. 4. Here, PPU 16 is connected to a dedicated external memory 33. A dedicated external memory 33 is preferred since the conventional, external (DRAM) memory 11 normally associated with CPU 10 is not usually configured to provide the data bandwidth and data throughput presently contemplated by the architecture of a game system incorporating a PPU. Such data transfer considerations will be discussed in greater detail below. However, 128 bit data transfers between PPU 16 and a dedicated 512 MB double data rate (DDR) external memory 33 are currently contemplated. Clearly, PPU 16 need not be universally configured with its own dedicated, external memory 33. It is very possible that PPU 16 might share an external memory with GPU 12 and/or CPU 10. This possibility is particularly relevant, given continued improvements to the data throughput of DDR memory systems and their likely progeny.

Returning to FIG. 4, connections between PPU 16 and a PC (or a stand alone game console, both not shown) may consist of, for example, a USB2 connection 35, an IEEE 1394 (Firewire) connection 36, and/or one or more of several PCI Interfaces 34, including as examples, PCI, PCI-X, and/or PCI-Express. As presently contemplated, PPU 16 also includes an asynchronous serial interface 31 which allows debugging over an RS-232 link, additional general purpose I/Os 30 provided for low level debugging and status reporting, and/or an IEEE 1149.1 Joint Test Action Group (JTAG) interface 32 provided for the debugging of software running on the PPU 16.

Physical incorporation of PPU 16 into a PC may be accomplished using one of several approaches. First, a PPU may be incorporated using a standard PC Interface (PCI) card optionally inserted within the PC. Alternatively, a PCI-Express Interface card might be used. A USB2 or Firewire connection to an externally packaged PPU module might be used instead of a internally configured interface card. It is readily foreseeable that a PPU and a GPU will be combined on a single interface card. That is, both chips will be physically mounted on the same card (AGP or PCI-Express), but not directly interfaced with one another. Ultimately, a single interface card having a directly interfaced PPU-GPU combination is expected, but such a combination is probably a generation away. So too is a combination within a single chip of PPU and GPU functionalities.

Figure 1:
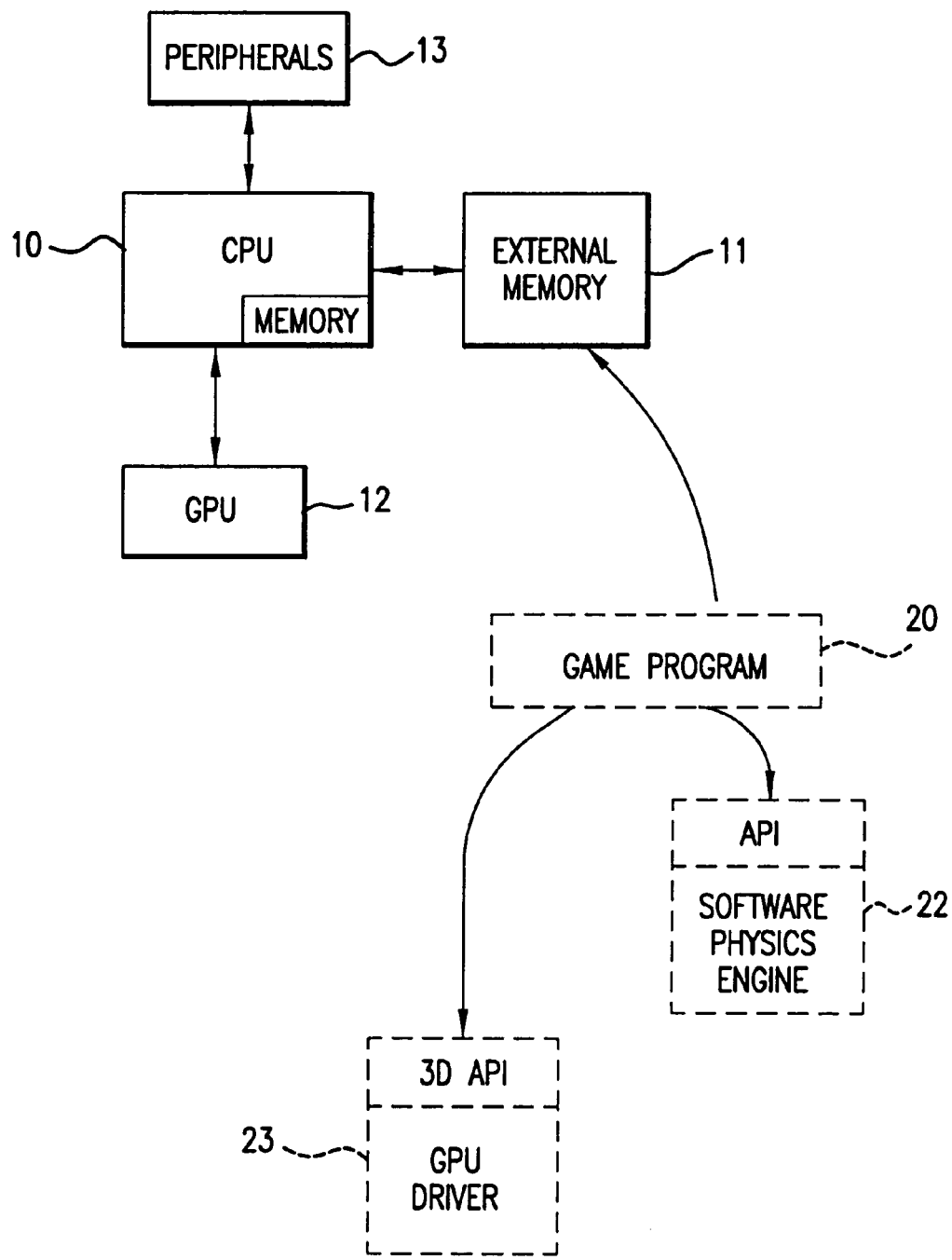
FIG. 1 is a conceptual illustration of the principal hardware and software components forming a conventional game system including a software-based physics engine.
Figure 5:
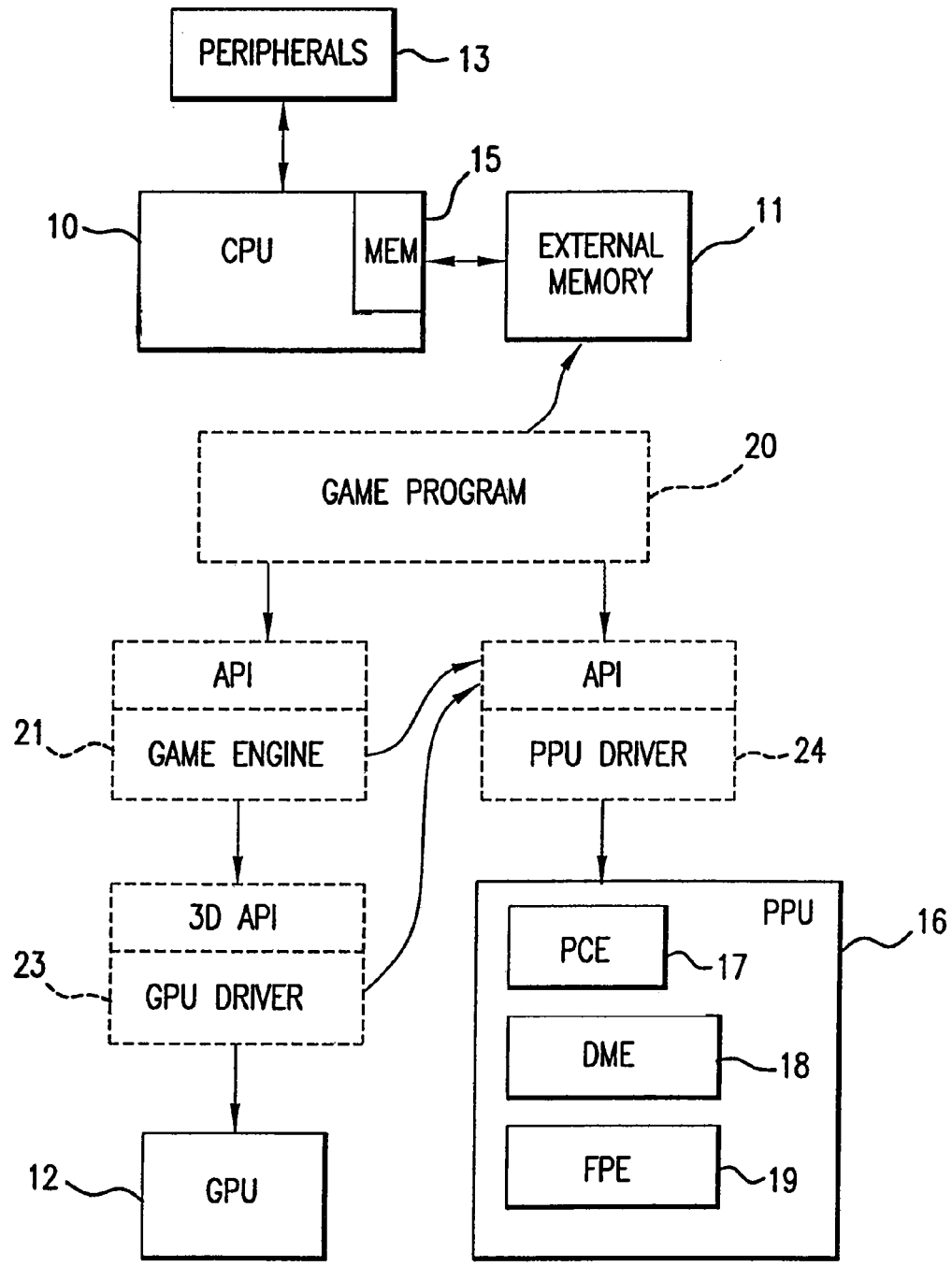
FIG. 5 is a conceptual illustration of the principal hardware and software components forming a game system including a PPU according to the present invention.

Exemplary hardware/software relationships for a game system incorporating a PPU, as compared with the conventional relationships shown in FIG. 1, are shown in FIG. 5. A PC environment adapted for use with a PPU is conceptually illustrated with hardware elements shown in solid line and software elements shown in dotted line. CPU 10 having internal memory cache(s) 15 is conventionally connected to one or more peripherals 13 and an external memory 11. A main game program is typically stored in external memory 11 and/or a peripheral 13. Additionally, as shown in FIG. 3, the present invention provides for the operative connection of PPU 16 to CPU 10. GPU 12 will also be typically connected to CPU 10.

In addition to game engine 21 and GPU driver 23, and their associated APIs, the present invention provides a PPU driver 24 with an associated API. PPU operation is directed through the PPU driver by at least game program 20. With this arrangement, game physics are principally (if not solely) implemented in a dedicated hardware device designed specifically to provide physics simulation data. This contrasts sharply with the conventional approach of implementing physics completely in software run on the general purpose CPU.

In one exemplary embodiment as shown in FIG. 5, PPU 16 further comprises a PPU Control Engine (PCE) 17, a Data Movement Engine (DME) 18, and Floating Point Engine (FPE) 19. The functionality currently provided by conventional software-based physics engines is separated across the PCE, DME, and FPE engines in PPU 16.

Generically, PCE 17 comprises a microprocessor core, for example a reduced instruction set computer (RISC), controlling overall operation of the PPU. For example, PCE 17 controls the physics simulation and communicates with the PPU driver running on the host CPU, but performs only operations that are not computationally intensive or bandwidth demanding. Whenever such operations are needed, PCE 17 issues appropriate commands to DME 18 and/or FPE 19. These commands preferably instruct DME 18 to execute programs to perform data movement operations, and include the necessary parameters for these programs. The DME programs can also call FPE programs to perform any required data computations.

As currently contemplated, conventional software-based physics engines may be adapted to run on (i.e., "be ported to") PCE 17, and may call microcode routines running on DME 18 and FPE 19. PPU 16 provides a library of common linear algebra and physics related algorithms implemented using the DME and FPE. However, application specific or custom algorithms may also be defined within PPU 16 for execution by the DME and FPE.

Figure 6:
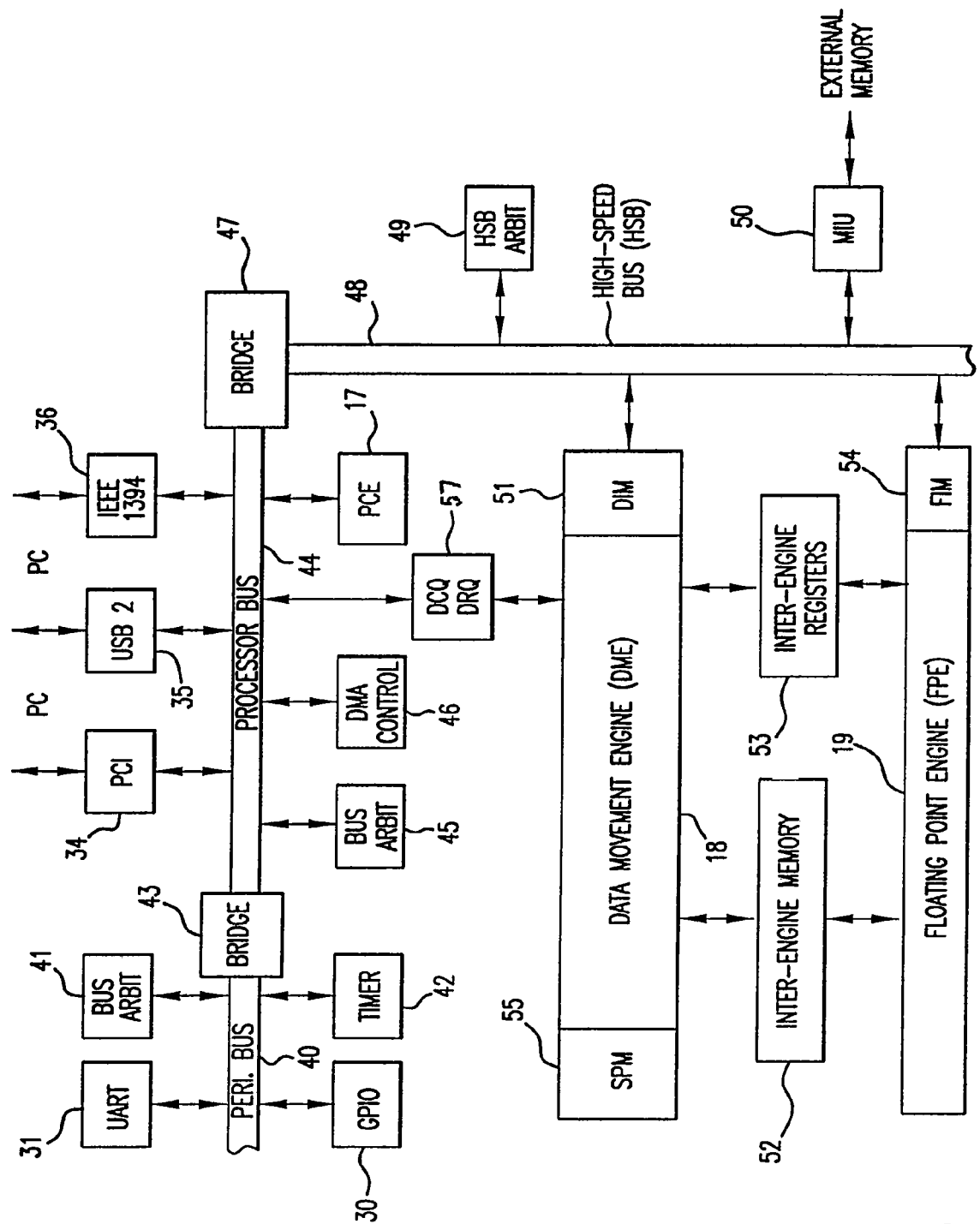
FIG. 6 illustrates in some additional detail a presently preferred embodiment for the PPU of FIGS. 3, 4, and/or 5.

The exemplary PPU architectures shown in FIGS. 3-5 are shown in some additional detail beginning with FIG. 6. The various elements described below connect to a peripheral bus 40 and processor bus 44 to form a processor architecture similar to conventional embedded system on a chip (SOC) designs. Within this expanded architecture, processor bus 44 is respectively connected with peripheral bus 40 and high-speed data bus (HSB) 48 via conventional bus bridges 43 and 47. Peripheral bus 40 allows connection of the PPU to general I/Os 30 and a universal asynchronous receiver/transmitter (UART) 31, as examples, using a peripheral bus arbitration circuit 41 and timer circuit 42. Processor bus 44 facilitates connection of the PPU to a host (a PC or stand alone game console) via one or more physical interfaces, such as PCI interface 34, USB2 controller 35, and/or an IEEE 1394 Firewire Interface. The RISC cores forming PPU Control Engine (PCE) 17 also connect to processor bus 44, along with a processor bus arbitration circuit 45 and DMA controller 46. A DCQ/DRQ circuit 57 connects processor bus 44 directly with Data Movement Engine (DME) 18.

A High-Speed data Bus (HSB) 48 together with a Memory Interface Unit (MIU) 50 form the connection between the PPU and an external high-speed memory (not shown). DME 18 and FPE 19 provide the high-speed computational platform necessary to provide complex, real-time physics simulation data. In order to access external memory, as managed by MIU 50, processor bus 44 issues read/write requests to bridge 47 connecting processor bus 44 with HSB 48.

To enable efficient data movement, eight DMA channels are contemplated to allow simultaneous data transfer from one or more of the host interfaces (PCI, USB, Firewire) to/from the PPU external high-speed memory. In addition, memory transfers may occur between the PPU external high-speed memory and DME Instruction Memory (DIM) 51, or the FPE Instruction Memory (FIM) 54. The HSB 48 provides a priority access scheduling between these various memories using HSB arbitration circuit 49. Inter-engine memory (IEM) 52 and inter-engine registers (IER) 53 allow data communication directly between DME 18 and FPE 19. In one aspect, DME 18 may be viewed as a programmable engine designed to efficiently move data between the external high-speed memory and one or more PPU internal memories (e.g., SPM 55 or IEM 52).

As presently preferred, the external high-speed memory associated with the PPU uses ultra-threading data transfer techniques to facilitate simultaneous memory use by both the DME and FPE. The memory banks formed by IEM 52 and IER 53 also support two parallel threads of execution. At any given time, one thread is able to run on the FPE, and the other on the DME.

As noted above, the PPU Control Engine (PCE) 17 manages all aspects of the operation of the PPU. It communicates with the host over one or more of the physical interfaces. It manages the definition and allocation of all internal and external memories, and controls execution of DME programs through the DME control interface 56.

Figure 7:
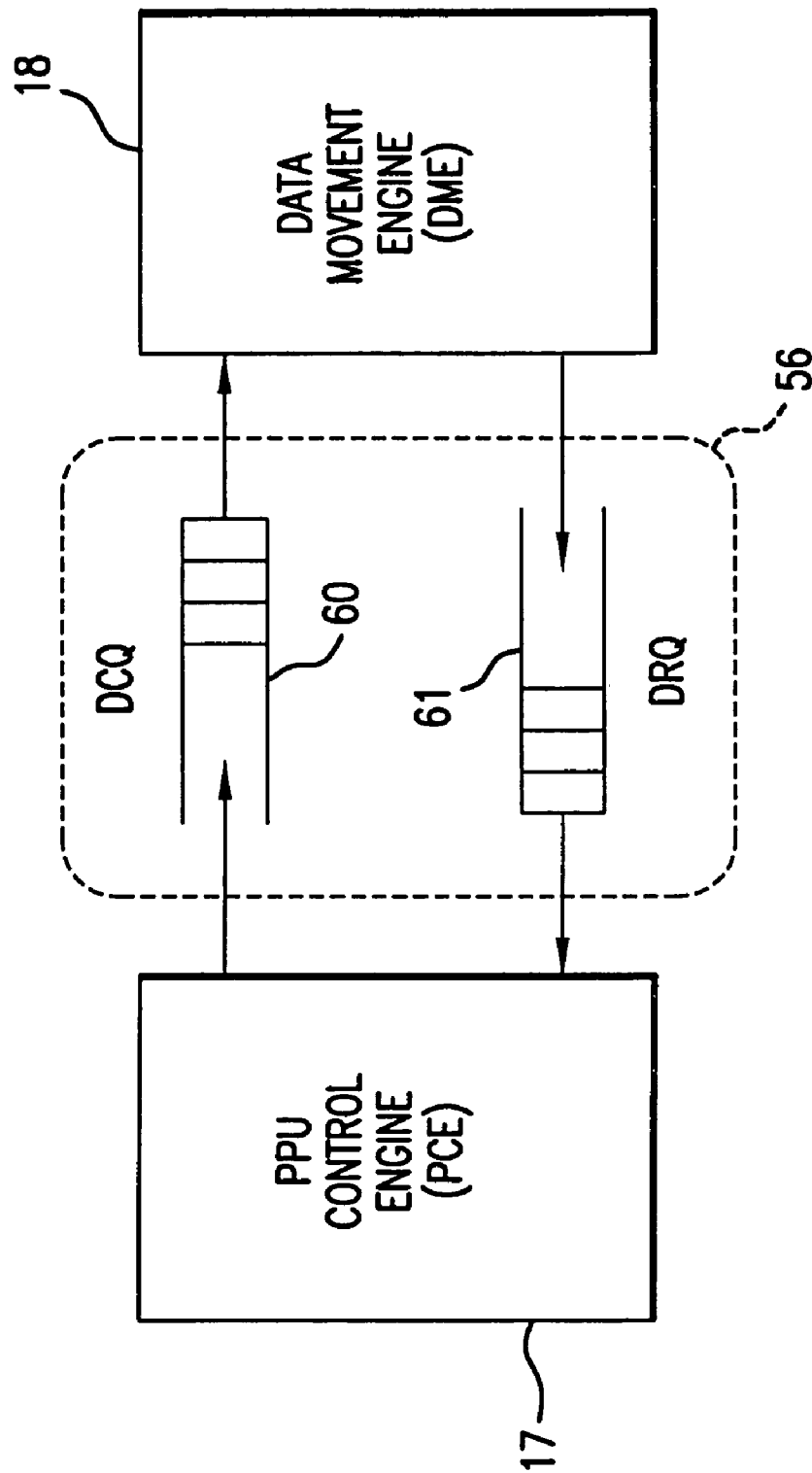
FIG. 7 further illustrates the DCQ/DRQ connection between the PCE and DME of FIG. 6.

The communication role of the DME control interface 56 between PCE 17 and DME 18 is further illustrated in FIG. 7. In this exemplary embodiment, PCE 17 communicates with DME 18 via a pair of memory-resident queues (60 and 61). The queues are implemented in dual-ported memory, one port on the processor bus and the other directly connected to DME 18, to form circular buffers with read/write pointers. PCE 17 writes DME command packets to the DME Command Queue (DCQ) 60 when it wishes to execute a DME program. Each DME command packet contains a starting address for the DME program to be run, along with various parameters and control flags. When DME 18 is ready to execute another program, it removes the next DME command packet from DCQ 60. Following execution of a DME command packet, DME 18 generates a DME response packet and transmits it to the DME Response Queue (DRQ) 61. Each DME response packet contains relevant computational results and/or status information.

Figure 8:
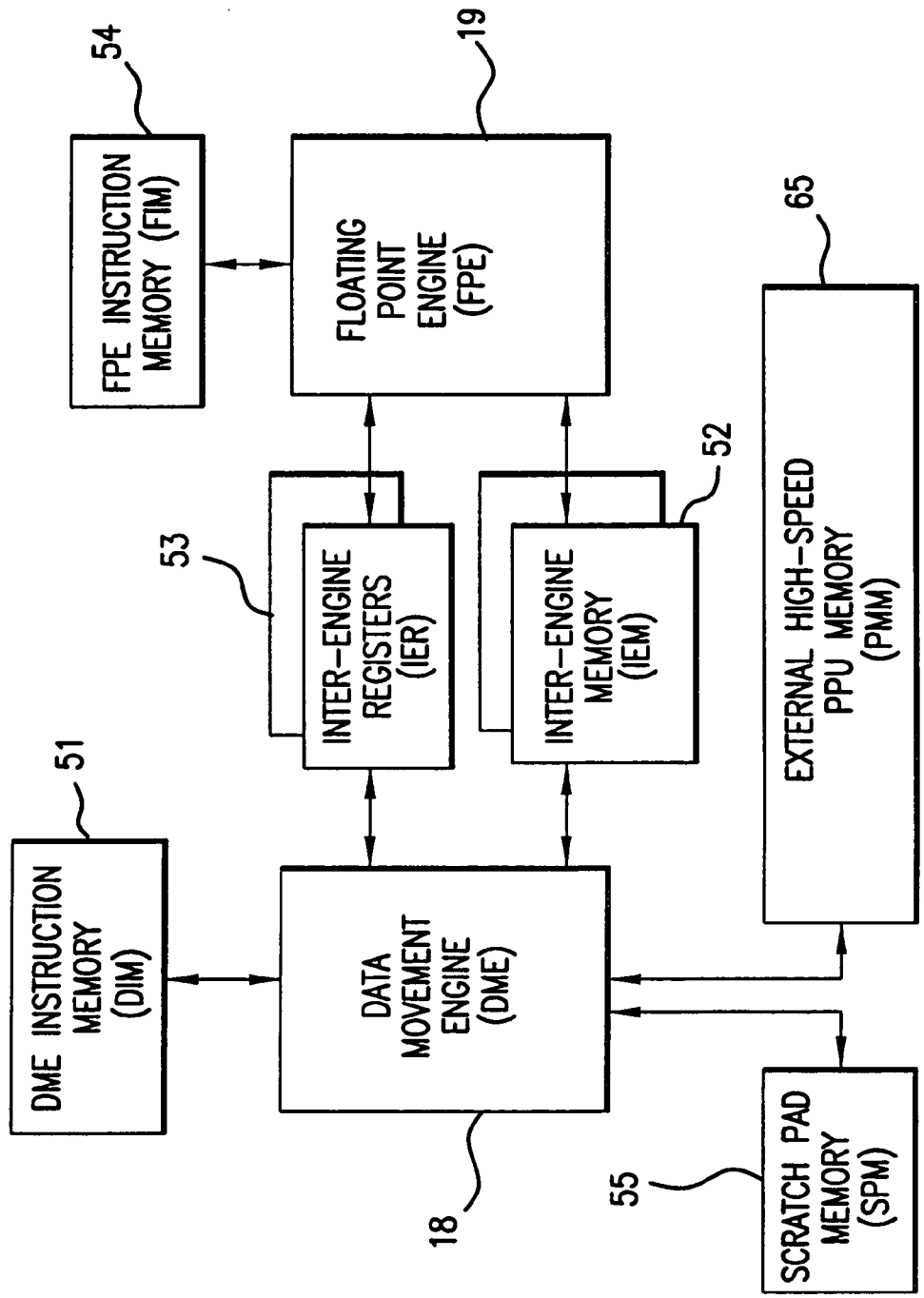
FIG. 8 further illustrates the relationship between the DME and FPE of FIGS. 5 and/or 6 and various memories.

The exemplary relationship described above between DME 18, FPE 19, and the various internal and external memories is further illustrated in FIG. 8. External, high-speed, main PPU memory (PMM) 65 and Scratch Pad Memory (SPM) 55 receive/send data transfers under the control of DME 18.

Programs associated with DME 18 control three important aspects of PPU operation. First, they specify how data is to be moved between PMM 65 and various internal memories such as IEM 52 and SPM 55. Second, they control execution of programs associated with FPE 19. Finally, they schedule ultra-threading context switches. As presently preferred, DME 18 uses a data-driven programming model, i.e., the basic structure and control flow of DME programming is largely fixed. More particularly, DME programming contains a list of parameters controlling data transfer operations, calling FPE programs, and initiating context switches. As presently contemplated, DME programming consists of a combination of two data elements types; those that control memory movement, and those that control ultra-threading.

Ultra-threading techniques allows DME 18 and FPE 19 to operate simultaneously. The preferred dual bank structure of IEM 52 and IER 53 allow DME 18 to transfer data to/from one bank while FPE 19 operates on data stored in the other bank. When FPE 19 and DME 18 have both completed their respective operations, a context switch occurs, and each engine can subsequently access the other bank of IEM 52 and/or IER 53. Ultra-threading thus allows FPE 19 to operate continuously, without waiting for data to be transferred to/from internal or external memory.

Figure 9:
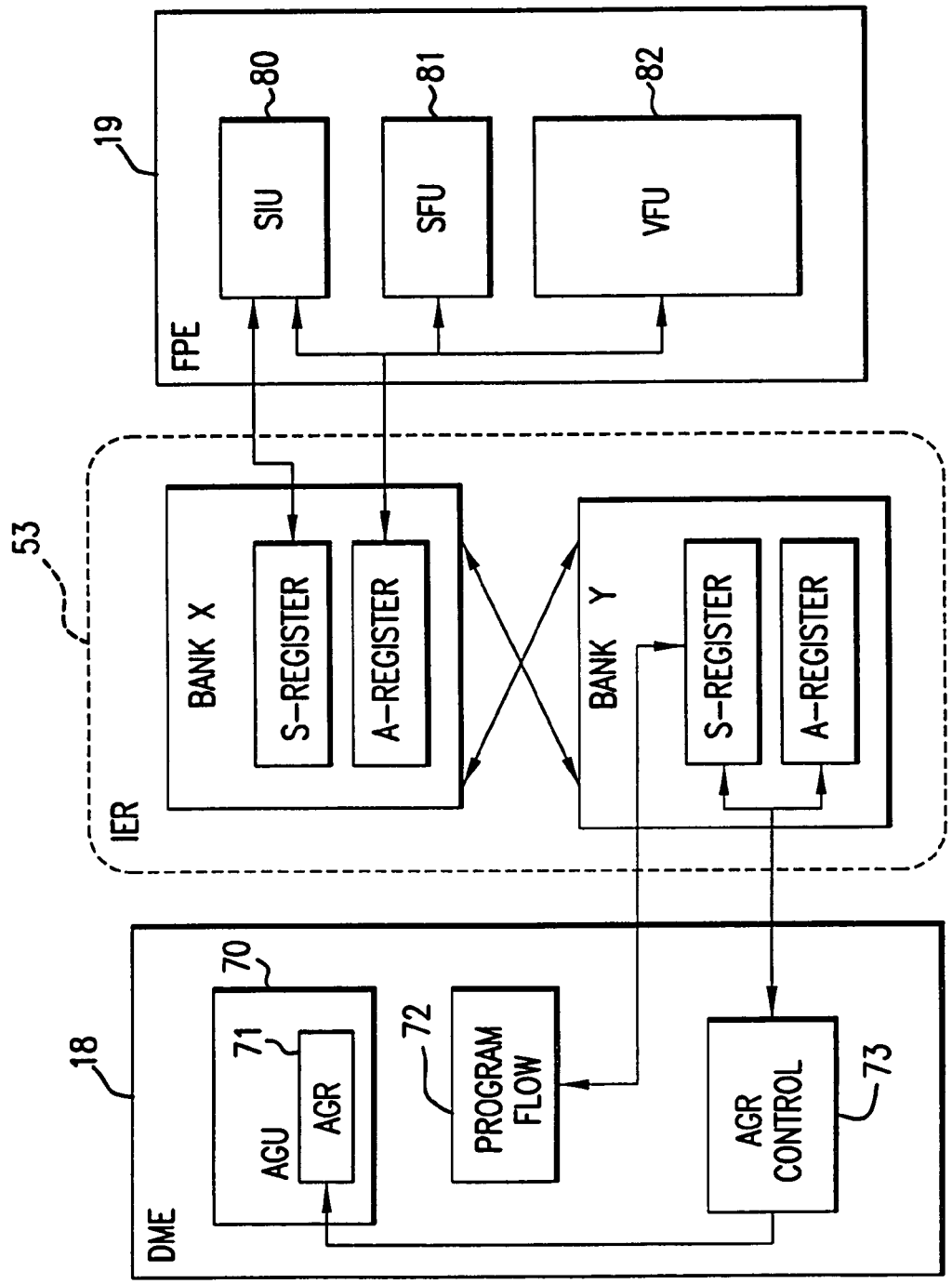
FIG. 9 further illustrates the relationship between the DME, FPE, and IER of FIG. 8.

The operation of the Inter-Engine Registers (IER) 53 between DME 18 and FPE 19 is further illustrated in FIG. 9. As presently preferred, IER 53 consists of two register banks (X and Y), each register bank comprising at least two registers (S and A), where all registers default to zero upon DME program initialization, or upon an explicit initialization by PCE 17. In the illustrated example, DME 18 accesses Bank Y registers and FPR 19 accesses Bank X registers during a given cycle. Address Generation Register (AGR) control 73 can load either IER register (S or A). Further, DME loop variables may be loaded by a DME program flow controller 72. Address Generation Unit (AGU) 70 and associated Address Generation Registers 71 within DME 18 cooperate to define program addressing commands for FPE 19.

Once DME 18 has loaded addressing instructions and variable definitions, access to banks X and Y in IER 53 is switched, and FPE 19 is able to access the information loaded by DME 18 and/or load corresponding floating point data for transmission back to DME 18. A Scalar Integer Unit (SIU) 80, a Scalar Floating-point Unit (SFU) 81, and a Vector Floating-point Unit (VFU) 82 are illustrated in FIG. 9 as common constituents of FPE 19 having access to IER registers.

Figure 10:
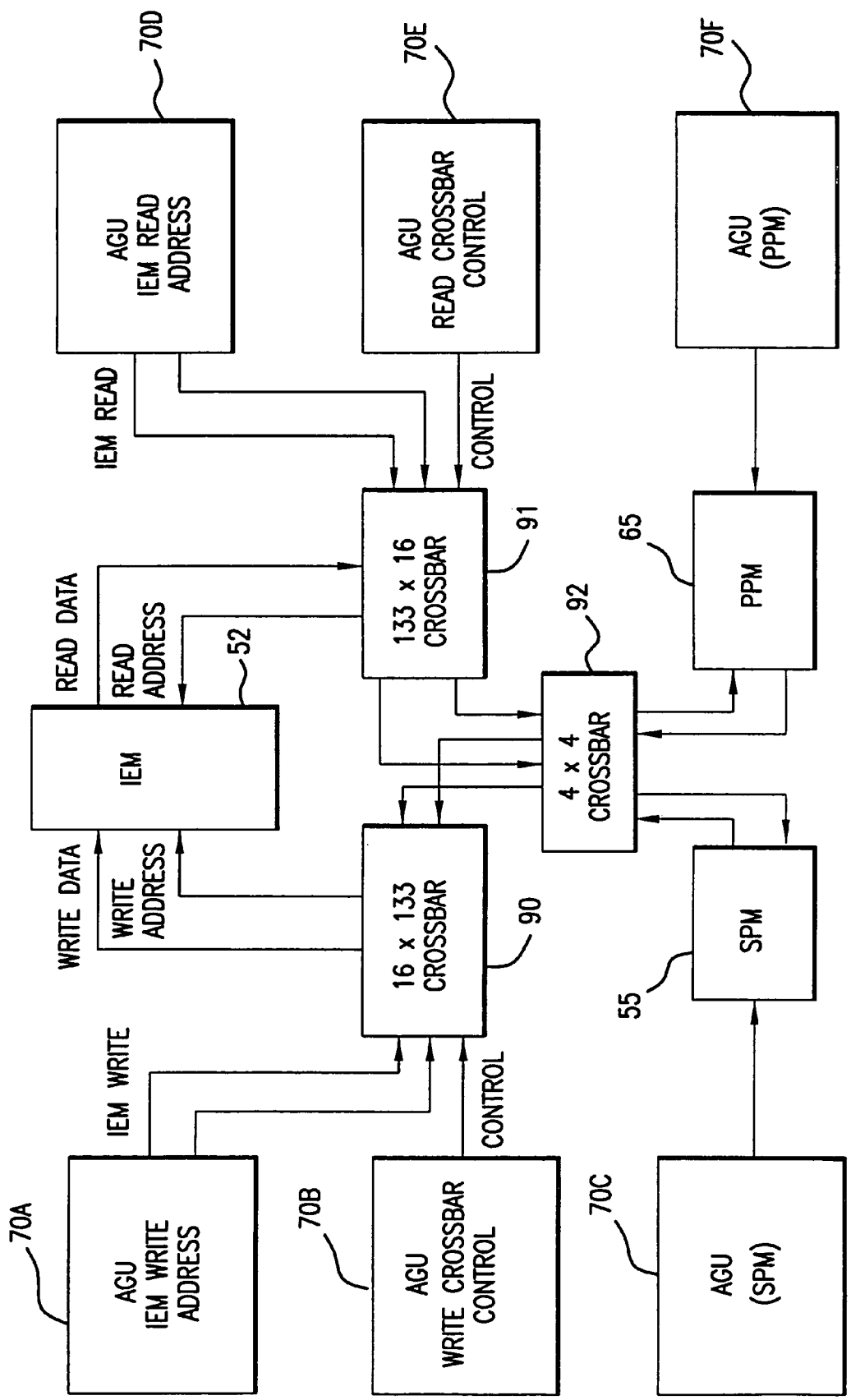
FIG. 10 illustrates an exemplary embodiment of the FPE where appearing in the above Figures in some additional detail.

DME data movement, as further illustrated in FIG. 10, is preferably accomplished in the preferred embodiment by means of a 16×133 unidirectional crossbar 90, a 133×16 unidirectional cross bar 91, and a 4×4 bi-directional crossbar 92. As presently contemplated, each port of the two unidirectional crossbars (90 and 91) carries 32 bits of data and 8 bits of IEM address data. Each port of the bi-directional crossbar 92 carries 256 bits of data.

The 133-port side of each unidirectional crossbar is connected to a currently active (i.e., accessible) bank of IEM 52. On the other side of the crossbars, two groups of eight input and eight output ports are connected to the 4×4 bi-directional crossbar 92. The 4×4 bi-directional crossbar 92 allows each group of eight input and output ports to be connected to each other, SPM 55, or PMM 65.

Thirty-two Address Generation Units (AGU) (70B and 70E) control the unidirectional crossbars. In any given clock cycle, they select 16 of 133 IEM's to use for input, and 16 of 133 IEM's to use for output. Another 32 AGU's (70A and 70D) generate addresses for the selected IEM ports (16 read addresses and 16 write addresses). Two more AGU's (70C and 70E) generate addresses for SPM 55 and PMM 65, respectively.

In the illustrated example, data transfers through the crossbars are controlled by up to 66 Address Generation Units (AGUs). Each AGU preferably implements a pair of nested loops with programmable step sizes and iteration increments. This exemplary configuration allows a PPU programmer great flexibility in moving data in and out of IEM 52. For example, data can be simultaneously moved between 16 pairs of IEM ports, or data can be simultaneously moved between PMM 65 and 8 IEM ports and between SPM 55 and another 8 IEM ports.

Thus, DME programs may contain multiple data movement instructions. Each instruction specifies the source(s) and destination(s) of the data transfer, and provides control registers associated with the AGUs with the necessary input values. This designed readily facilitates bi-directional data transfers between PMM 65 and IEM 52, between SPM 55 and IEM 52, and between PPM 65 and SPM 55.

Data movement instructions must either specify an actual value for the required AGU registers, or may specify a S-register or A-register for use. This approach allows dynamic control over addressing since initial values for these registers are provided by the PCE, and the SIU of the FPE can modify these registers between context switches.

Depending on the configuration of 4×4 bi-direction crossbar 92, up to three data transfers can be programmed to occur simultaneously. For example, a PMM to SPM transfer and a SPM to PMM transfer can run in parallel with several IEM to IEM transfers.

After a DME program has performed all necessary operations on Inter-Engine Registers (IER) 53 and the Inter-Engine Memory (IEM) 52, it sends an instruction to FPE 19 to begin executing a microcode procedure. This FPE start instruction may contain, for example, an address in FPE Instruction Memory (FIM) 54 indicating the start of an FPE program.

Ultra-threading techniques allow the PPU programmer to achieve a near 100% utilization of FPE 19. When a DME program first begins execution, it has access to only one bank of IER 53 and IEM 52, respectively. During this time FPE 19 will either be idle, or running a procedure for a previous DME program and using the other banks of IER 53 and IEM 52. Typically, the DME program will load data from PPU Main Memory (PPM) 65 into a current IEM bank. When this transfer is complete, the DME program will issue a FPE start instruction. While an FPE program is running, the DME program also continues running, but now DME 18 has access only to the other IER/IEM banks. Only after the DME program and FPE program both indicate completion does another context switch occur. The DME program can then transfer the physics simulation data generated by the first FPE program from the first IEM bank back to an internal or external memory. This cycle repeats as often as necessary to complete a DME program.

Figure 11:
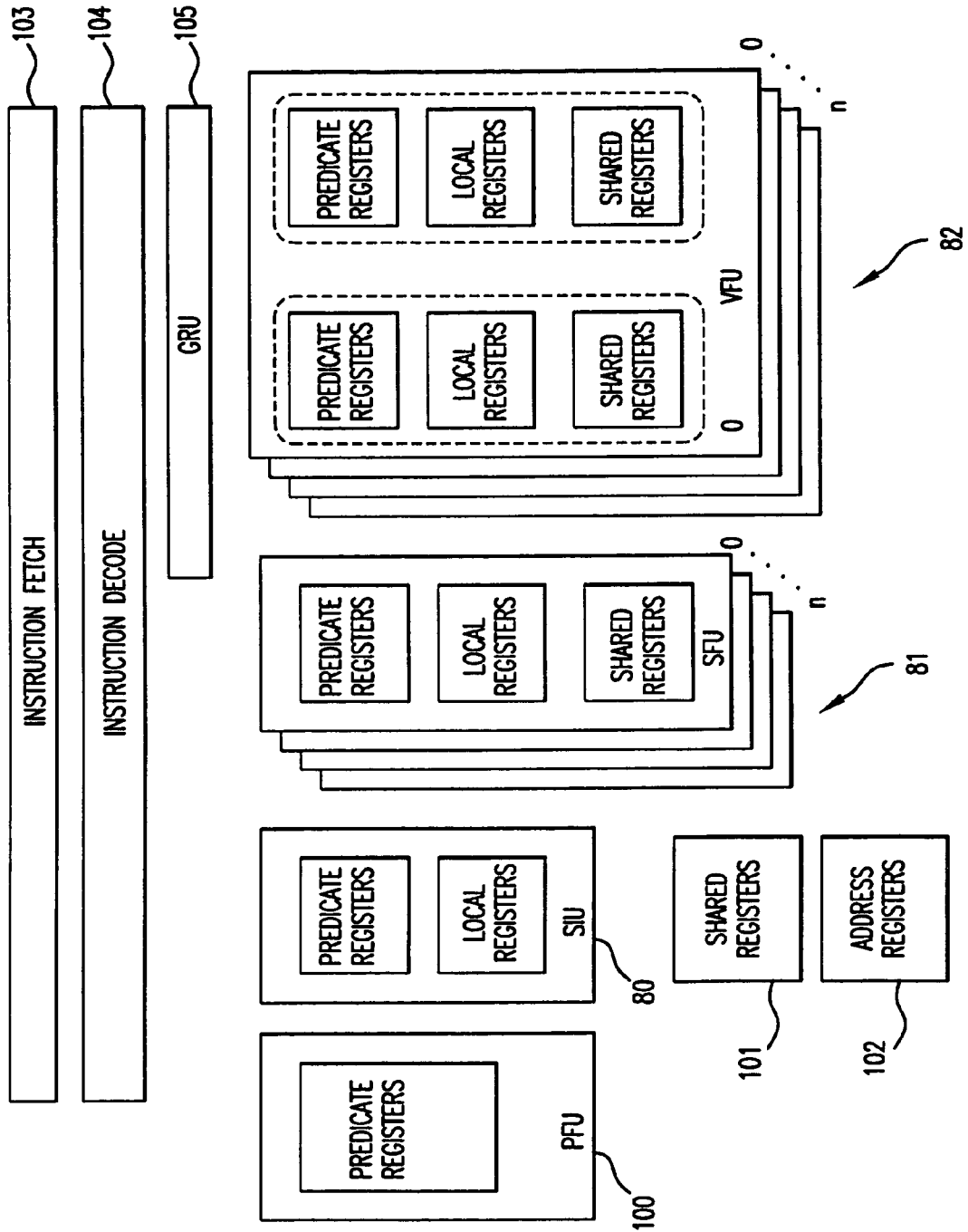
FIG. 11 further illustrates the FPE of FIG. 10.

The major programming elements associated with FPE 19 are conceptually illustrated in FIG. 11. In one presently preferred embodiment, FPE 19 is a hybrid Vector/Very Long Instruction Word (VLIW) processor. FPE 19 executes microcode procedures once all necessary operations on Inter-Engine Registers (IER) 53 and the Interface Engine Memory (IEM) 52 have been completed by DME 18 and a FPE start instruction is issued. The FPE start instruction contains an address stored in FPE Instruction Memory (FIM) 54 that indicates the beginning of the requested FPE procedure.

FPE 19 provides ultra-high performance, single precision vector floating point operations as well as scalar floating point and integer operations. It preferably uses a VLIW architecture to perform multiple vector and scalar operations during each clock cycle. FPE 19 provides the computational power to run the numerically intensive algorithms required in physics simulations.

In one embodiment, FPE 19 comprises a Scalar Integer Unit (SIU) 80 with direct read/write access to the S-registers and A-registers in the ultra-threading activated IER bank, four Scalar Floating Point units (SFU) 81 and four Vector Floating Point unit (VFU). PFU 100 controls the program flow based on the content of predicate registers managed by either SIU 80 or SFU 81.

Since the preferred embodiment of FPE 19 uses a VLIW architecture, multiple instructions can be explicitly issued to parallel execution modules during any given clock cycle. Each instruction word, as provided by instruction fetch and decode circuitry 103 and 104, contains opcodes and operands for one or more of the following modules: Program Flow Unit (PFU) 100, Scalar Integer Unit (SIU) 80, Global Register Unit (GRU) 105, Scalar Floating-point Unit (SFU) 81, and/or Vector Floating-point Unit (VFU) 82.

Within FPE 19, the Program Flow Unit (PFU) 100 computes the new instruction pointer based on predicate registers and explicit jump requests. Only selected predicate registers from SIU 80 and SFU 81 may be accessed by PFU 100.

The Inter-Engine Memory (IEM) 52 provides high-speed dedicated data storage for each of the execution units in FPE 19. When an execution unit of the FPE accesses its dedicated data storage element it automatically gets directed to the active bank for the currently executed program thread.

IEM 52 preferably comprises 128 storage elements for VFU 82, 4 storage elements for SFU 81, and 1 storage element for SIU 80. A typical storage element is composed of two, 2-port memories, each with 512 32-bit fields. One read and one write can be executed during every clock cycle to this memory.

FPE 19 preferably implements a load/store architecture for each of the execution units. Associated address registers are managed by SIU 80. The contents of the registers are distributed to all execution units and can be used in order to address data in the date storage elements of IEM 52 associated with the corresponding execution unit. Local registers, shared registers (VFU only), global registers can be addressed in order to move data between them or to/from IEM 52.

SIU 80 preferably comprises a 16-bit integer-processing unit. The unit's main purpose is to enable loop processing and address computation for VFU 82 and SFU 81. In order to communicate with DME 18, SIU 80 is able to access the active bank of IER 53 and IEM 52 respectively for the currently executed programming thread in FPE 19.

As presently contemplated, SIU 80 incorporates eight 16-bit Arithmetic Logic Units (ALUs), thirty-two 16-bit registers, and eight predicate registers. IER 53 provides an additional eight address registers and eight shared registers. SIU 80 thus enables eight ALU operations, including one load and one store operation, during each clock cycle. Exemplary ALU operations provided by each of the eight ALUs in SIU 80 include, as examples: bitwise operators (AND, OR, XOR, and complement); arithmetic operators (increment, addition, decrement, subtraction, multiply, and left/right shifts); and logic operators ($<, >, \leq, \geq, =,$ and $\neq$).

As presently preferred, Vector Floating-point Unit (VFU) 82 comprises 32 IEEE 754 compliant, single precision, floating point units (FPUs). Four Vector Floating-point Units (VFU) 82 are grouped together as shown in FIG. 11 and are controlled through a single instruction word. Different FPUs are indexed as VFU m:n, where m ranges from 0 to 3 and denotes the different VFU blocks (VFU0, 1, 2 and 3) and ranges from 0 to 31 and denotes the different FPU's within each VPU block.

Each FPU contains 16 local registers and 8 shared registers. The shared registers are shared among the 4 different VPU blocks, that means VPU0.1, VPU1.1, VPU2.1 and VPU3.1 have access to the same shared register. The shared registers are mainly used during physics integration processes in which the position of all active objects is updated. The FPUs have access to global registers in GRU 105. These global registers may be used as an operand for arithmetic operations, but the result has to be stored in a local register.

Each FPU can handle one load, one store, one addition/subtraction/comparison and one multiplication instruction every clock cycle. In addition, a predicate logic operation is available to operate on predicate registers. Each FPU also contains predicate registers, which can be used to perform conditional operations on the current vector. The load, store, add/subtract and multiplication instructions can be performed conditionally on any of these predicate registers. The predicate registers can be either set through the comparison command, through exceptions or individually through SIU 80. In order to allow more complex conditional operations, predicated register logic is available to set a particular predicate register based on logical operations of two other predicate registers.

In the working example illustrated in FIG. 11, there are four separate Scalar Floating-Point Units (SFU) 81 which are used to perform additional scalar arithmetic floating point operations. The operations provided in SFU 81 are a superset of the operations provided by an individual execution unit (FPU) within VFU 82.

SFU 81 contains 16 local registers and in addition to the load, store, add/subtraction and multiplication blocks, the SFU includes a hardware division block and a square root block. SFU 81 also contains 8 predicate registers. Selected predicate registers are forwarded to SIU 80 and PFU 100 to allow conditional operations. Additional shared registers 101 and address registers 102 are available to all four SFUs 81.

In addition to their local registers, SFU 81 and VFU 82 have access to a set of eight global floating-point registers, GRU 105. These registers can used as a source operand in place of a local register. However, SFU 81 and VFU 82 cannot use the global registers as destination operands. Rather, a separate module must be programmed to move data into the global registers. This module can move data from any local floating-point register of SFU 81 or VFU 82 modules into a global register. It can also transfer data between global registers.

Figure 12:
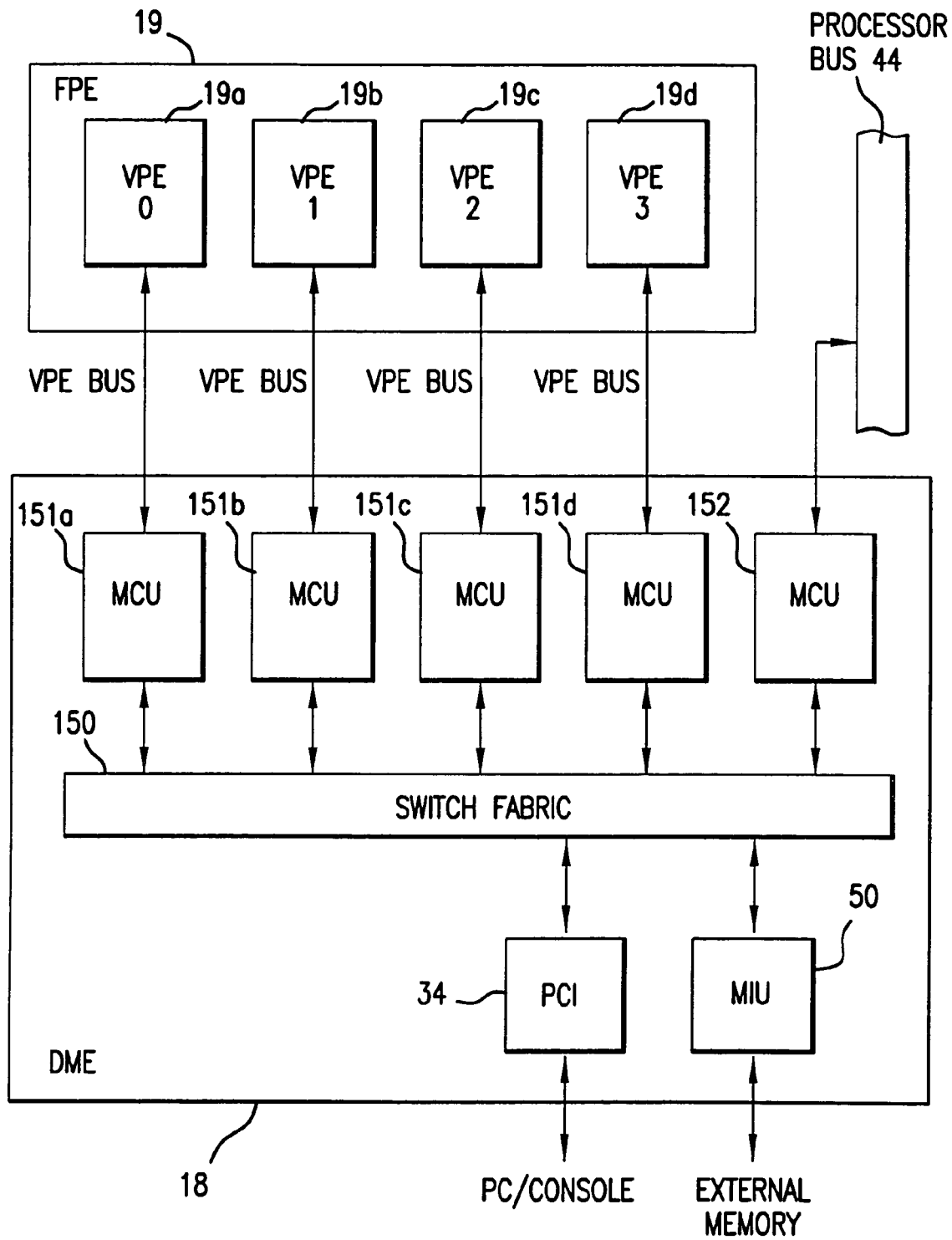
FIG. 12 illustrates in relation to another embodiment of the present invention the implementation and relation between the FPE and DME of the PPU.

Another presently preferred embodiment is illustrated in relevant part in FIGS. 12 through 15. As shown in FIG. 12, the internal configuration of FPE 19 and DME 18 have changed, as compared with the foregoing. MIU 50 and PCI 34 interface blocks have been incorporated into DME 18. High Speed Bus (HSB) 48, HSB Arbiter 49, and Bridge 47 have been removed. DME 18 is connected to the Processor Bus 44 instead of to HSB 48.

FPE 19 comprises, for example, four Vector Processing Engines (VPE), 19a, 19b, 19c, and 19d, instead of the configuration shown in FIG. 11, including a SIU, and a plurality of SFU and VFU units. DME 18 further comprises a Switch Fabric 150, five MCU (151a through 151d and 152), PCI 34 and MIU 50. The five MCUs, PCI 34, and MIU 50 interface with Switch Fabric 150 which provides bi-directional communication between these units. Four of the MCUs (151a, 151b, 151c, and 151d) interface respectively with the four VPEs (19a, 19b, 19c, and 19d) in FPE 19. The fifth MCU, 152, interfaces with Processor Bus 44 to enable communication between DME 18 and PCE 17.

Figure 13:
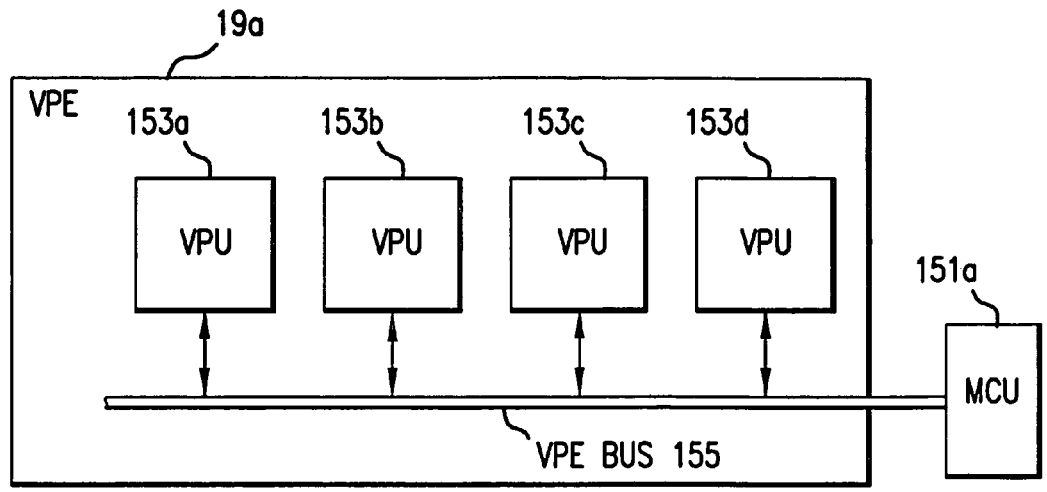
FIG. 13 illustrates in some additional detail the VPE shown in FIG. 12.

As shown in FIG. 13 (VPE 19a is illustrated), each VPE preferably comprises four Vector Processing Units (VPU), 153a, 153b, 153c, and 153d, which respectively interface with a VPE Bus 155. VPE Bus is preferably 256 bits wide, and provides each VPU with bi-directional communication with a corresponding MCU and with the other associated VPU's.

Figure 14:
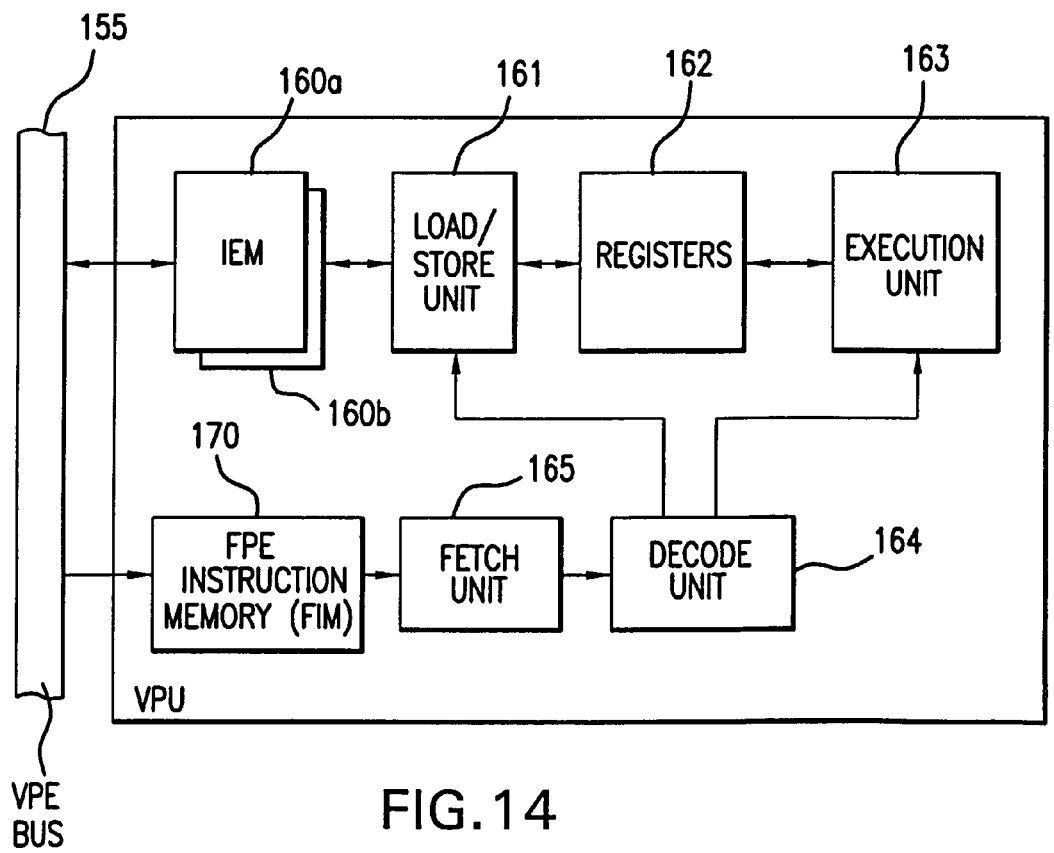
FIG. 14 illustrates in some additional detail the VPU shown in FIG. 13.

An exemplary configuration for the VPUs is shown in FIG. 14. Here, each VPU comprises two banks of memory 160a and 160b formed by an IEM and a bank of the FPE Instruction Memory (FIM) 170. Each VPU further comprises a bank of Registers 162, an Execution Unit 163, a Load/Store Unit 161, a Decode Unit 164, and a Fetch Unit 165. In one presently preferred embodiment, Registers 162 include sixteen 32-bit floating-point registers and eight 32-bit integer registers. Execution Unit 163 preferably includes six Floating-point Multiply-Accumulate units (FMAC) and an integer Arithmetic Logic Unit (ALU).

Figure 15:
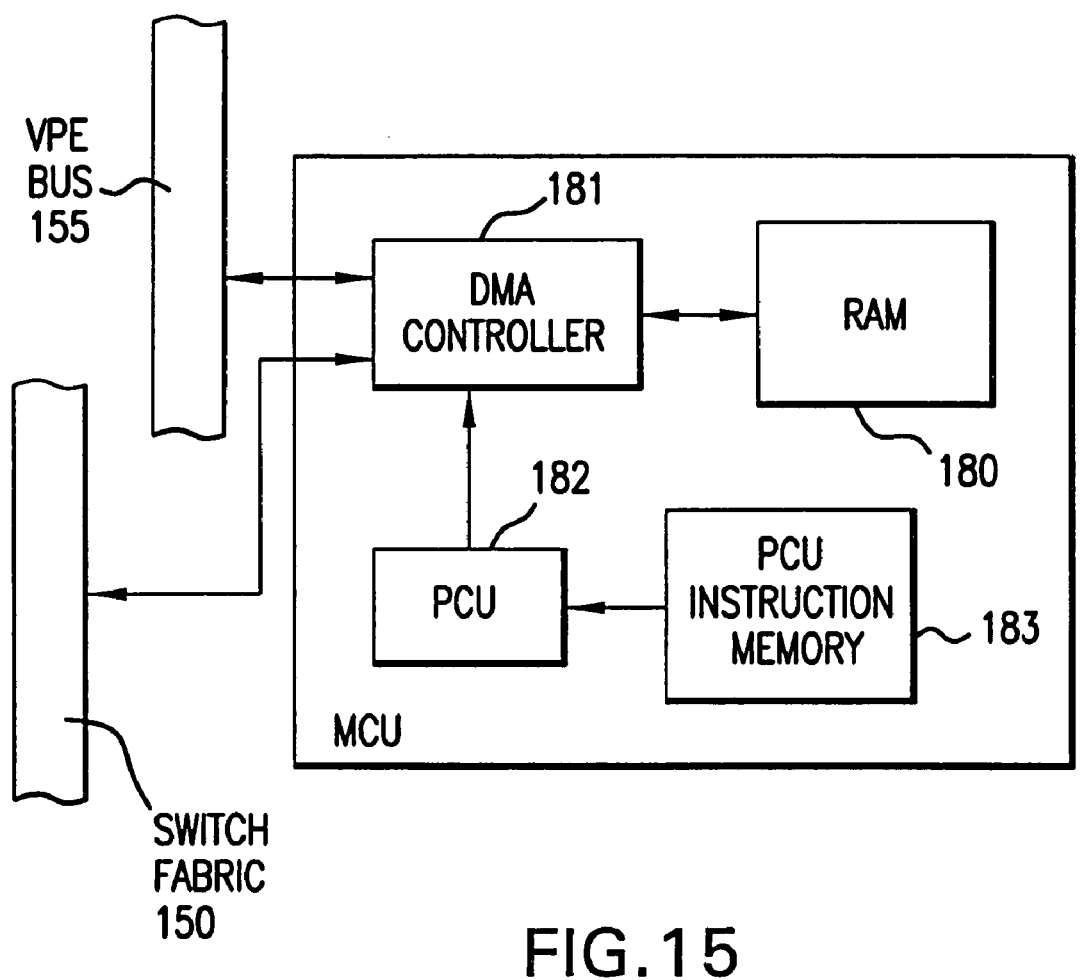
FIG. 15 illustrates in some additional detail the MCU shown in FIG. 12.

As shown in FIG. 15, each MCU comprises a bank of Random Access Memory (RAM) 180 and a Direct Memory Access (DMA) controller 181. DMA controller 181 can be configured to transfer data bi-directionally between RAM 180 and devices connected to VPE Bus 155. DMA controller 181 can further be configured to transfer data, bi-directionally, between RAM 180 and Switch Fabric 150. As presently preferred, each MCU further comprises a programmable Processing Controller Unit (PCU) 182 and a PCU Instruction Memory 183. Software programs may be stored in PCU Instruction Memory 183 and executed on PCU 182 for the purpose of configuring DMA controller 181 to transfer data to and from RAM 180.

Each MCU may be viewed as a programmable engine designed to efficiently move data bi-directionally between RAM 180 and devices connected to VPE Bus 155, or between RAM 180 and Switch Fabric 150.

In a presently preferred embodiment of a Data Movement Engine (DME), four MCUs are each interfaced through VPE Bus 155 with a Vector Processing Engine (VPE). Each Vector Processing Engine further comprises four Vector Processing Units, each of which is preferably interfaced to the VPE Bus. As noted, the fifth MCU is interfaced to Processor Bus 44 for the purpose of providing bi-directional communication with the PPU Control Engine (PCE) 17.

A Switch Fabric facilitates the bi-directional transfer of data between the attached modules (e.g., MCUs, PCI, MIU). As presently preferred, Switch Fabric 150 comprises seven bi-directional 256 bit ports. The Switch Fabric may simultaneously transfer data between any one or more pairs of modules attached to its ports.

A PCI or similar interface (e.g.: PCI-X, PCI-Express, S-Bus, USB2, IEEE 1394 Firewire) is preferably attached to one port of the Switch Fabric, and facilitates connection of the PPU to an attached host computer (a PC or stand alone game console).

A Memory Interface Unit (MIU) is preferably attached to another port of the Switch Fabric, and forms the connection between the PPU and an External Memory (not shown). In order to access external memory, as managed by MIU 152, Memory Control Units (MCU) issue Direct Memory Access (DMA) data transfers requests to the MIU, through the Switch Fabric. In addition, memory transfers may occur between External Memory and PCI, between an MCU and PCI, and between individual MCUs.

Figure 16:
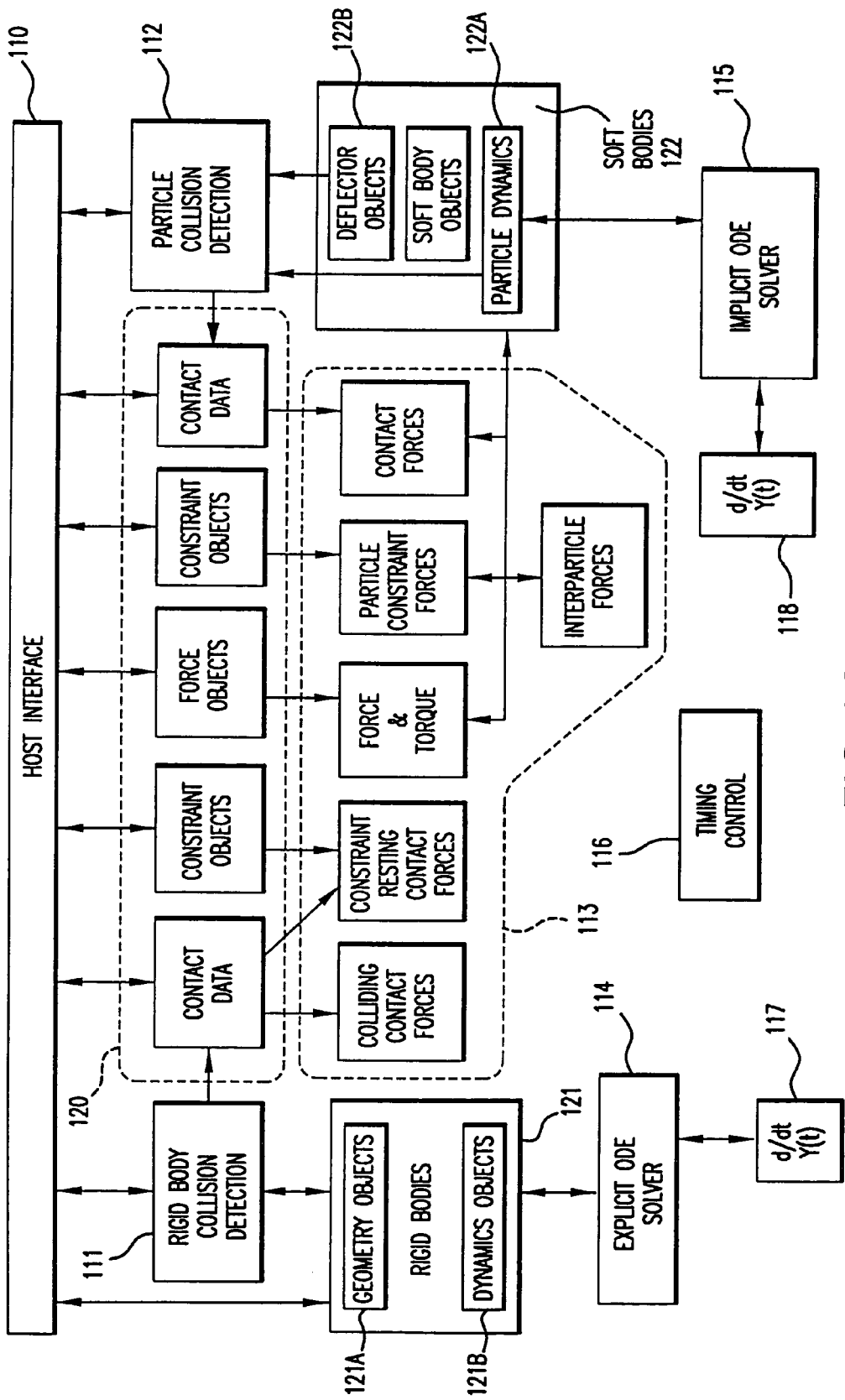
FIG. 16 illustrates various functions and data structures of an exemplary PPU designed in accordance with one or more aspects of the present invention; and, FIG. 17 illustrates a multi-level API structure, whereby PPU driver is variously called to initiate operation of a PPU accordance with one or more aspects of the present invention.

FIG. 16 illustrates in one embodiment an exemplary physics simulation for a PPU designed and/or implemented in accordance with present invention. Conceptually, the physics simulation consists of one or more hardware module(s) shown in relation to and one or more software module(s). Wherever possible, the present invention seeks to shift execution responsibility for computationally intensive tasks to a hardware module. The software module provides the interface between the hardware and a controlling/requesting application. The software module also provides a variety of non-computationally intensive functions. The particular embodiment described below is a presently preferred example. Numerous design alternatives and modifications will be apparent to those of ordinary skill in the art. For example, the designation of a software/hardware boundaries as per individual functionality is clearly subject to individual adaptation.

The architecture of the physics simulation can be conveniently described in terms of its data structures and functional blocks. The rigid and soft body data structures are at the heart of the architecture. They contain all of the physical parameters and state information for every simulated object. Physical parameters describe the geometry (which is used for detecting collisions between objects), as well as the kinematics and dynamics (which are used in the physical simulation) of the bodies. They are initially configured by the application, but can also be accessed and modified while a physics simulation is running. Other data structures that are configured by the application include, as examples, force objects and constraint objects. Likewise, these data structures can also be modified as the physics simulation is running. The contact data structures are automatically re-generated at every simulation time step by the collision detection block, but can be accessed by the application as the simulation is running.

The simulation in the example illustrated in FIG. 16 includes four major functional areas: a host interface 110, collision detections (e.g., rigid body collision detection 111 and particle collision detection 112), force computation 113, and dynamics simulation (e.g., Open Dynamics Engine (ODE) solvers 114 and 115, timing controller 116, and differentiation blocks 117 and 118). Each of these functional areas consists, in turn, of one or more functional blocks.

Host interface 110 provides the controlling/requesting application(s) with access to the data structures as well communication with, and configuration of, all hardware units. It is also responsible for providing event notification to the application(s), (e.g. monitoring an object for collisions).

Collision detection, just as its name implies, is responsible for detecting collisions between objects during a physics simulation. At each time step of the simulation, the collision detection blocks update the contact data structures. The contact force computation unit uses this information to calculate the forces necessary to prevent the bodies from interpenetrating. It can also be accessed by software through the host interface. Collision detection, as presently preferred, is divided into two basic forms rigid body (e.g., hard surfaces, moving solid bodies, etc.) collision detection 111, and particle (i.e., soft bodies such as water, smoke, cloth, etc.) collision detection 112.

Force computation generally consists of three functional blocks which, for each time step, calculate various components of force and torque that are being applied to each rigid body or particle set. First, contact forces are computed as the result of contact (collision or resting contact) between bodies. Second, application defined forces are computed by evaluating the force objects configured by the application. Third, constraint forces are computed in order to guarantee that bodies will not move in ways that would not violate the constraints configured by the application through the use of constraint objects. These various forces and torques are added into the force and torque accumulators for each object. Accordingly, some exemplary force computation functions 113 include: colliding contact forces, constraint resting contact forces, general force and torque, particle constraint forces, contact forces, and inter-particle forces.

Dynamics simulation components consists of a collection of ODE solvers (114 and 115), a timing control 116, and a differentiation block (117 and 118). Several ODE solvers, including explicit Euler, midpoint, and Runge-Kutta, are typically required in order to various levels of simulation precision. In addition, an implicit integration method (e.g., Back Euler) is also required for simulating the particle meshes used in soft bodies. Timing control 116 is responsible for determining and communicating the size of the next simulation time step. This can be affected by collisions, as well as error estimates generated by one or more of the ODE solvers. Differentiation block 117/118 is responsible for calculating the current time derivative (slope) of each body's state vector. The state vector contains the current position, rotation, linear momentum, and angular momentum of a rigid body. For particles, it contains only the current position and linear momentum.

Rigid body data structures 121 contain all the physical parameters and state information for every simulated object. Physical parameters describe the geometry (which is used for detecting collisions between objects), as well as the kinematics and dynamics (which are used in the physical simulation) of the bodies. They are initially configured by the application, but can also be accessed and even modified as the simulation is running.

Geometry Objects 121A describe the shape of a rigid body, are used exclusively for computing collisions with rigid bodies. They are associated with dynamics objects. As presently contemplated, the following types of geometry objects are supported: simple primitive (e.g., sphere, box, plane, cylinder, particle), polygonal mesh (e.g., concave, convex), and geometry group. A polygonal mesh geometry object contains a pointer to a list of vertices and a pointer to a list of faces. Faces can be represented as a triangle strip, or as individual triangles. Hierarchies of geometry objects can be created using the geometry group primitive to represent complex rigid bodies. All geometry objects include a transform (e.g., translation, rotation, scale) that relates the object's local coordinate system to a parent object's coordinate system, or to a world coordinate system, if the object lacks a parent.

The following fields are preferably stored in a geometry object: object type, parent geometry object or dynamics object pointer, transformation (e.g., a 4×4 matrix), parameters for simple primitives, triangle vertex list pointer, and a triangle face list pointer.

Special "ghost" geometry objects can be created that are not associated with a dynamic object. These geometry objects are only used by the collision detection block, and collisions with these objects do not affect the physical simulation. Ghost objects are useful for generating events that notify the application when a body has moved into or out of a defined space.

Dynamics Objects 121B contain all the data associated with a rigid body, other than its shape. This data is initially configured by the application, but is automatically updated at every simulation time step. The following fields are stored: physical constants (e.g., inverse of mass, inverse of inertia tensor), state vector (e.g., position, rotation, linear momentum, angular momentum), derived quantities (e.g., inverse of inertia tensor, linear velocity, angular velocity, rotation matrix), and computed quantities (e.g., force accumulator, torque accumulator).

Dynamics Objects 121B can be temporarily disabled by the application. While disabled, they do not participate in the physical simulation.

Soft bodies 122 are used for simulating particle meshes or lattices such as cloth, rope, smoke, water, and fire. Each soft body consists of a mesh or lattice of particles, connected with simple damped springs. Unlike rigid bodies, soft bodies do not require geometry objects, since the geometry of a soft body is implicitly defined by the positions of the particles in the mesh or lattice.

Particle Dynamics Objects 122A are soft body analogs to rigid body dynamics objects discussed above. Much like a rigid body, each soft body particle has data associated with it, but since particles are point masses there is no need for storing moment of inertia, rotation, angular momentum/velocity, or torque. The following fields are stored: state vector (e.g., position, velocity), and other quantities (e.g., inverse of mass, force accumulator).

For compatibility with a conventional software-based physics engine, collisions are calculated between soft body objects and special Deflector Objects 122B. Deflector objects 122B only represent geometry and hence do not participate in the physical simulation.

Force Objects are configured by the application in order to apply forces to the rigid and soft bodies that have been created. Although an application can modify force objects at each time-step, even the data-driven force objects are sophisticated enough that for most forces, an object can be created, and allowed operate without intervention for the duration of its existence. Force objects can be used to easily simulate gravity, viscous drag, springs, and spatial interactions (e.g., field forces).

Each force object can be configured to exert a force, and thereby possibly producing torque, on a single rigid body (i.e., an unary force), or equal but opposite forces on two rigid bodies (i.e., a binary force). A force object can also be configured to exert a force on every rigid body in a physics simulation. Force objects can also act on soft bodies. In such cases, a force can be made to act on a single particle, every particle in a single soft body, or every particle in every soft body.

Data driven force objects are a simple way for the application to control standard types of forces acting on various bodies. The simplest data-driven force object is the constant force. At each time step, this object will exert a constant force and/or torque on a specified object. A constant force object may be updated periodically, possibly at every time step, by the application, or may be left alone until deleted. Data-driven force objects can also exert forces that are simple mathematical functions of the parameters in the dynamics object (e.g. position, velocity, angular momentum, etc).

For more sophisticated forces, instead of just providing a mathematical function, the application can provide a procedure to compute a force (i.e., a procedural force object) that will be applied to a body or between bodies. This allows reduced communication with the application at each time step, since the procedural object can calculate the proper force, instead of requiring the application to provide it.

Constraint objects are applied to both rigid and soft bodies. Rigid body constraints allow the application to configure various restrictions on the way rigid bodies move. These constraints are also known as "joints". The following types of constraints are typically supported: ball and socket, hinge/axle, slider/piston, universal, springs, fixed, angular motor. Constraint objects allow configuration of limits on the relative motions and orientations of the constrained bodies. These limits allow constraints such as hinges to only twist through a limited angle, or for rag doll limbs to ensure that they always maintain realistic poses. Joints with friction lose energy as the joint is manipulated, so that rotations around constraints eventually come to rest. Soft body constraints allow the application to configure various restrictions on the way soft bodies move. The position of individual particles or strips of adjacent particles can be constrained relative to a specified reference frame.

The collision detection blocks (111 and 112) generate contact data at every simulation step. Contact data represents the input to the contact force computation blocks, but can also be accessed by the application, through the host interface. For rigid bodies, the most common contacts are vertex/face contacts and edge/edge contacts. A vertex/face contact occurs when a vertex of one polyhedron is in contact with a face on another polyhedron. An edge/edge contact occurs when a pair of edged contact. It is assumed in this case that the two edges are not collinear. For example, a cube resting on a table, but with its bottom face hanging over the edge would still be described as four contacts; two vertex/face contacts for the vertices on the table, and two edge/edge contacts, one on each edge of the cube that crosses over an edge of the table. The contact data structure typically contains the following information: Body "A" (containing vertex), Body "B" (containing face), contact point (world space), outward pointing normal of face, edge direction for "A", edge direction for "B", and Boolean to identify vertex/face or edge/edge contact.

The Host Interface block 110 manages all communication between the PPU and the controlling/requesting application. As presently preferred, the Host Interface is formed by an operative combination including a PPU driver resident in the host and one or more hardware or software components resident in the PPU. Host Interface 110 is responsible for managing event notification and filtering. This allows the application to be notified only of events that it cares about. It provides the mechanism for the application to create, modify, and delete rigid body, force and constraint objects. It allows the application to periodically access all position and orientation data for bodies that have moved.

The simulation Timing Control 116 is responsible for determining and communicating the size of the next simulation time step. This can be affected by collisions, as well as the error estimate generated by the ODE solver (115 and/or 117). It communicates with the ODE Solver to determine the error estimate, and if the estimate exceeds a configured threshold, it reduces the time step, and restarts the solver. It also communicates with the Collision Detection unit (111 or 112), and when a collision occurs near the middle of a large time step, it approximates the actual collision time, and backs-up the simulation closer to the time when the two bodies first came into contact.

A lot of research has been done in the field of collision detection, and many good algorithms have been developed. Many algorithms can exploit "coherence" to reduce the amount of work that must be performed at each time step. Coherence is the use of information from previous time-step to reduce work. For example, when processing two objects, A and B, if a separating plane can be found for which all of the vertices of A lie on one side, and all of the vertices on B lie on the other side, the equation of the plane can be stored and used in subsequent time steps to easily verify that the objects have not collided with each other. Additional work only need to be performed if separating plane test fails.

Many algorithms use bounding box hierarchies to reduce the complexity of collision detection processing. See, e.g., U.S. patent application No. 2002/0154128. Typically, the hierarchy is defined by the application, however, at the cost of some additional processing, it could be created automatically by the physics simulation. Various types of bounding boxes can be used, such as Axis Aligned Bounding Boxes (AABB's), Object-aligned Bounding Boxes (OBB's), and spherical bounding boxes.

Another algorithm uses a multi-resolution hash table to detect collisions in O(n). The three dimensional world is divided into a regular grid. Lower resolution (larger cell size) grid levels are superimposed on the initial grid. When each object is added to the hash table, a grid level is selected such that the object occupies no more than eight cells (voxels) of the grid. For each occupied cell, a corresponding entry is added to the hash table. The hash function is computed using the X, Y, and Z coordinates of the cell, as well as the grid level. Once all objects are added to the hash table, a second pass is made through all objects, and only objects which are found to occupy the same grid cells are candidates for collision.

In a conventional software-based physics engine, between each integrator step, the application can call functions to apply forces to the rigid body. These forces are added to "force accumulators" in the rigid body dynamics object. When the next integrator step happens, the sum of all the applied forces is used to push the body around. The forces accumulators are set to zero after each integrator step.

By moving the implementation of the physical simulation onto hardware, the host CPU is freed from a large computational burden. However, opportunity for the controlling/requesting application to control the forces exerted on the various bodies in the simulation must be provided. This is accomplished through force objects and the force and torque computation block.

The simplest force objects are the data driven force objects. Whenever the application wishes to apply a force to one or more objects, it creates a force object. If the force is constant or can be expressed as a simple mathematical function of parameters in the dynamics object (such as position or velocity), a data-driven force object can be used. The application identifies one or two bodies that the force should be applied to (e.g. gravitational attraction, magnetic forces, etc.), or specifies that the force should be applied to all bodies (e.g. gravity, air resistance, etc.).

When more sophisticated forces are required, the application can create procedural force objects. The application provides a procedure that can be executed at each time step to compute the force that should be applied. These procedures can make use of local variables to store data, and can also access parameters in the dynamics object.

Colliding contact occurs when two bodies are in contact at some point and they have a velocity toward each other. Colliding contact requires an instantaneous change in velocity. Whenever a collision occurs, the state of a body, which describes both position and velocity (actually the momentum is stored in the state vector, but momentum is a constant function of velocity), undergoes a discontinuity in velocity. The methods for numerically solving ODE's require that the state $Y(t)$ always varies smoothly. Clearly requiring $Y(t)$ to change discontinuously when a collision occurs violates that assumption.

This problem may, however, be avoided as follows. If a collision occurs at time $t_c$, the ODE solver is instructed to stop (or backup to $t_c$). Using the state at this time, $Y(t_c)$, the new velocities of the bodies involved in the collision are computed, and Y is updated. Then, the numerical ODE solver is restarted, with the new state, $Y(t_c)$, and simulates forward from $t_c$.

Consider two bodies, A and B, that collide at time $t_0$. Let $p_a(t)$ denote the particular point on body A that satisfies $p_a(t_0)$ =p. Similarly, let $p_b(t)$ denote the point on body B that coincides with $p_a(t_0)$=p at time $t_0$. Although $p_a(t)$ and $p_b(t)$ are coincident at time $t_0$, the velocity of the two points may be quite different. The velocity of the point $p_a(t)$ is:

$$d/dt\, p_a(t_0) = v_a(t_0) + \omega_a(t_0) \times (p_a(t_0) - x_a(t_0))$$

In the following equation, $n'(t_0)$ is the unit surface normal. Clearly, $v_{rel}$ gives the component of the relative velocity in the direction of the surface normal:

$$v_{rel} = n'(t_0) \cdot (d/dt\, p_a(t_0) - d/dt\, p_b(t_0))$$

When $v_{rel} < 0$, the bodies are colliding. If the velocities of the bodies don't immediately undergo a change, inter-penetration will result. Any force that might be applied at P, no matter how strong would require at least a small amount of time to completely halt the relative motion between the bodies. Therefore, a new quantity J, called an impulse is used. An impulse is a vector quantity, just like a force, but it has units of momentum. Applying an impulse produces an instantaneous change in the velocity of a body.

Constraint and resting contact force must also be computed. Whenever bodies are resting on one another at some point (for example, a particle or rigid body in contact with the floor with zero velocity), they are said to be in "resting contact." In this case, a force must be computed that prevents the body from accelerating downward. Unlike colliding contact, resting contact does not require a discontinuity in velocity.

Consider a configuration with n contact points. At each contact point, bodies are in resting contact, that is, the relative velocity $v_{rel}$ is zero (to within a numerical tolerance threshold). The distance between the each pair of contact points at future times $t \geq t_0$ may be expressed as:

$$d_i(t_0) = n'(t) \cdot (p_a(t) - p_b(t))$$

At each contact point, there must be some force $f_i n'_i(t_0)$, where $f_i$ is an unknown scalar, and $n'_i(t_0)$ is the normal at the i-th contact point. The goal is to determine what each $f_i$ is. In computing the $f_i$'s, they must all be determined at the same time, since the force at the i-th contact point may influence on or both of the bodies of the j-th contact point.

The ODE solver blocks (114 and 115) perform numerical integration of ordinary differential equations. Several explicit and implicit methods are available conventionally, with different levels of accuracy, however, increased accuracy requires additional computation. They support adaptive time-step sizes by, at each step, calculating and sending an estimate of the integration error to the simulation timing control block.

The differentiation block(s) (117 and 118) is responsible for calculating the current time derivative (slope) of each body's state vector. The state vector, Y, contains the current position, rotation, linear momentum, and angular momentum of a rigid body. For particles, it contains only the current position and linear momentum. This unit calculates: $d/dt\, Y(t)$, where $Y(t)$ is the state at time "t". The inputs to this block are the state vector and the force and torque accumulators stored in the dynamics object. For rigid bodies, $d/dt\, Y(t) = [v(t), \frac{1}{2}\omega(t)\, q(t), F(t), \tau(t)]$. For particles, $d/dt\, Y(t) = [v(t), F(t)/m]$.

The foregoing embodiment, including its constituent functional blocks, is one preferred embodiment of a PPU designed in accordance with the present invention. As has been noted above some conventional tools and solutions have been brought to bear on the problem of implementing a so-called "hardware-based" physics engine having expanded capability over conventional software-based solutions. Yet, the physics processor architecture of the present invention addresses specific requirements of complex physics simulations while avoiding the limitations inherent in conventional CPU. For example, in one aspect the PPU architecture of the present invention is characterized by the use of multiple, parallel, task-specific processing modules.

Extreme parallelism is advantageous since it provides the necessary floating point computational capacity required for solving the systems of equations inherent in a physics simulation. The Floating Point Engine (FPE) described in exemplary form above provides this capacity using vector processing units which operate on parallel, ultra-high bandwidth, low latency Inter Engine Memories (IEM). By avoiding the use of conventional caches and the associated processor stalls, the FPE is able to approach its theoretical maximum performance, even when operating on large data structures.

In order to keep the Inter Engine Memories (IEM) loaded with the data required by the FPE a massively parallel, crossbar-based, Data Movement Engine (DME) is provided. It transfers data between Inter Engine Memories (IEM), as well as to and from memory. Because each FPE floating point unit is given two Inter Engine Memories (IEM), the DME is able to operate in parallel with the FPE without blocking FPE access to the Inter Engine Memories (IEM).

In addition, the RISC CPU type architecture proposed, at least in the presently preferred embodiment, for the DME provides for general purpose processing of miscellaneous operations that are not computationally or bandwidth intensive. Such RISC CPUs use off the shelf cores and come with standard programming tools such as a C compiler, debugger, etc.

In another related aspect, the PPU of the present invention may be viewed as a hybrid vector processor adapted to use a Very Long Instruction Word (VLIW) Sets. That is, the DME and FPE engines presently preferred use custom instruction sets which are a hybrid between vector processing and VLIW architecture. Vector processing is needed to allow hundreds of floating point and data movement operations to be performed per clock cycle. The VLIW instruction word allows multiple vector and non-vector operations to occur with each other.

This prevents stalling the vector units while other non-vector operations are executed. Careful analysis of the algorithms required for physics simulation has resulted in an instruction word format that can always provide the necessary non-vector processing in parallel with the vector instructions. For example, the VLIW instruction word includes instructions for special purpose execution units such as the global register unit, and the branching unit. Explicit parallelism in VLIW also reduces the requirement for hardware pipelining, therefore, more silicon is available for instantiating additional floating point arithmetic units and for larger Inter Engine Memories (IEM).

In yet another related aspect, the PPU of the present invention makes use of large, parallel, on-chip Inter Engine Memories (IEM). The use of two banks of large Inter Engine Memories (IEM)eliminate the need for traditional caches. These Inter Engine Memories (IEM)combine the size of a traditional L2 cache with the low latency of an L1 cache. They also provide many times the bandwidth of an on-chip L1 cache, and do not incur any of the limitations of "set associativity".

Rather than using a Least Recently Used (LRU) algorithm and "set associativity" to determine what data should be kept in cache, the DME can be explicitly programmed to load the exact data set that the FPE will need to operate on. Through the use of ultra-threading technology, the FPE and DME engines exchange Inter Engine Memories (IEM) in a zero-latency context switch. The FPE can immediately begin operating on the newly loaded data, while the DME writes the results of the previous floating point operation(s) to memory, and loads the data for the next floating point operation(s).

Figure 2:
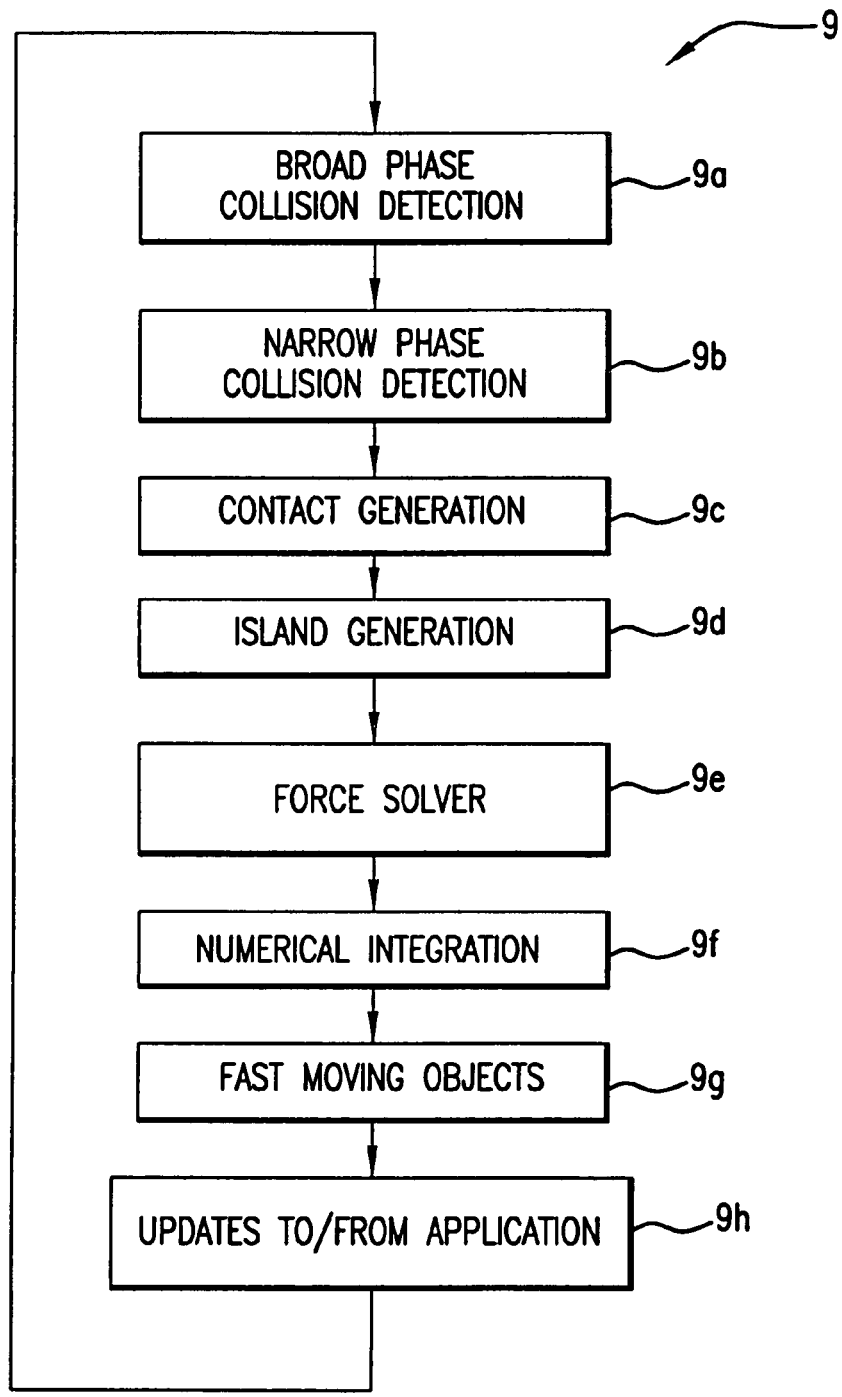
FIG. 2 is an exemplary flowchart showing a conventional sequence of functions called by a CPU to update rigid body information in a software-based physics simulation.

The method of communication between a controlling/requesting application and a PPU designed according to the present invention bear some additional discussion at this point. The conventional programming mechanism whereby the application derives physics simulation data from a software-based physics engine is described above in relation to FIG. 2 in the context of a typical rigid body physical simulation.

Within this simulation sequence, each function defined by the software-based physics engine is called once per timestep by the host CPU, and physics related data computations are returned directly to the CPU. When a physical simulation is running on the same device (CPU) as the controlling/requesting application, as is the case for a traditional software-based physics engine, the communication process between application and physics engine is straightforward. That is, the application simply calls each functional component of the physical simulation sequentially, and between calls, can directly access simulation data structures which are resident in the CPU's main memory, as well as make calls to the API associated with the physics engine. However, when a dedicated hardware device is used to develop physics simulation data, a different method of communication is required.

Figure 17:
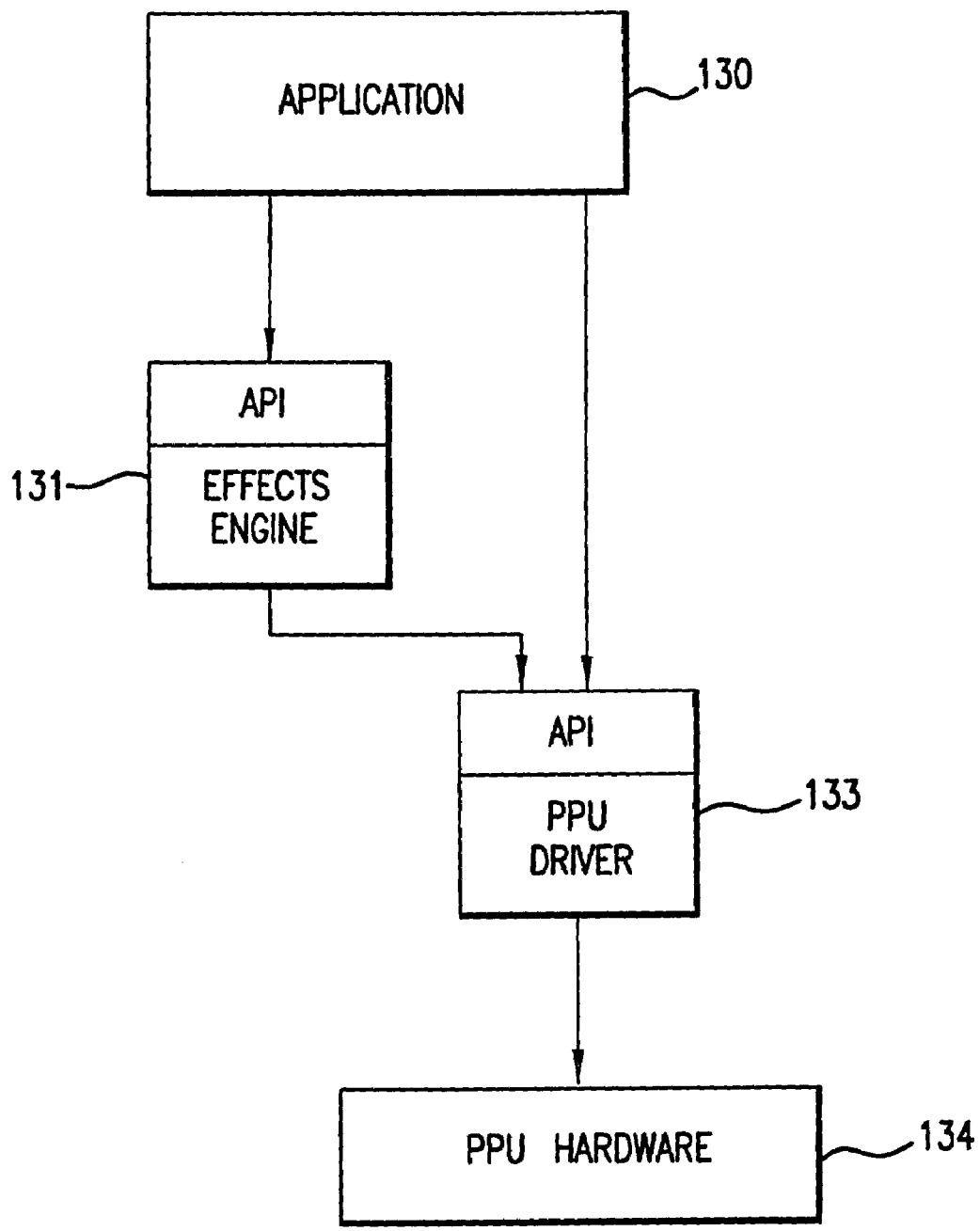

In one preferred embodiment consistent with the present invention, multi-level APIs are provided for use by the controlling/requesting application. These API's, and their underlying software, preferably run on the same device as the application, i.e., the host CPU. As shown in FIG. 17, the lowest level API 133 provides access a PPU Driver, which manages all communication between the CPU running application 130 and PPU hardware 134. The higher level APIs may be associated with, for example, a software-based physics engine, and/or a 3-D effects engine, here, shown combined as an Effects Engine 131.

PPU Driver 133 is preferably able to communicate with PPU 134 over a number of different physical interfaces, including as examples, USB, USB2, FireWire, PCI, PCI-X, PCI-Express, and Ethernet. It preferably supports asynchronous event notification to the controlling/requesting application using, for example, polling or interrupts communicated via signals or messages as required by the host. It also allows the application to make changes to the simulation in response to a received event notifications (e.g.: create/delete/modify rigid bodies or contact points).

Communication between PPU driver 133 and the PPU 134 may occur through a DMA or memory mapped I/O (or PIO). The communication mechanism preferably provides data to the application in a format that facilitates display data renderings using a 3D API, such as Direct3D or OpenGL. Further, it should also support optional (lossy or loss-less) compression of the data.

The PPU described thus far provides a number of remarkable benefits and overcomes the deficiencies of conventional, software-based physics engines. For example, the present invention provides in one aspect a PPU architecture specifically designed to run physics algorithms that otherwise threaten to bottleneck a host CPU. Such capability is provided within a PPU architecture that preferably provides collision detection for rigid and soft bodies, a Linear Complementarity Problem (LCP) solver, and numeric integration of ordinary differential equations.

The PPU architecture is characterized in a related aspect by the use of parallel, task-specific processing modules. The modules include a PPU Control Engine (PCE). The PCE preferably provides general purposes processing for various operations that are not computationally or bandwidth intensive. One suggested embodiment may be readily implemented with off the shelf RISC cores, and may make use of commercially available compilers and debugging tools.

The modules also include a Data Movement Engine (DME). In one aspect, this module is preferably a massively parallel device capable of efficiently moving large and/or numerous data blocks. It is preferable operated according to a data-driven programming model and flexibly allows data transfers (i.e., movements) between an external, high-speed memory and internal memory units. The DME should always move data sufficiently fast to avoid blocking or operation of the Floating Point Engine (FPE).

In one related aspect, the FPE is preferably a massively parallel floating point engine. As preferred, it uses no caches. It takes the form of a vector processor enabling up to hundreds of floating point and data movement operations per clock cycle. It also assumes the form of a Very Long Instruction Word (VLIW) architecture. This VLIW architecture allows multiple non-vector operations to occur in parallel with vector operations. Explicit parallelism in VLIW reduces requirements for hardware pipelining. Accordingly, more PPU chip space may be allocated to arithmetic units.

In yet another aspect, the PPU according to the present invention makes use of large, parallel, internal memories (i.e., Inter-Engine Memories—IEMs). Large IEMs eliminate the need for memory caches. Rather, explicit control in maintained over the contents of the internal memories. For example, 2 Terabits/second of bandwidth is presently contemplated for internal memories facilitating data movement to/from the FPE. The internal memory structure has no "set associativity" limitations.

In a related aspect, multi thread or ultra-threading data transfer techniques further contribute to the unique efficiencies provided by the present invention. By partitioning the IEMs into multiple banks, each floating point execution unit in the FPE has access to at least two independent IEMs. While the FPE execution units operate on one IEM bank, the DME has access to another bank. Zero-latency context switching between IEM banks precludes data stalls.

As has been noted, the foregoing sets forth a number of teaching embodiments. The present invention is broader than these exemplary embodiments. Indeed, the scope of the present invention is defined by the attached claims.

What is claimed is:

1. A method of incorporating physics simulation data into a game running on a game system comprising a host and a Physics Processing Unit (PPU) coupled to the host, wherein the host comprises a Central Processing Unit (CPU) and a host memory, the method comprising:
running a main game program on the host;
calling a PPU driver from the main game program;
initiating operation of the PPU, via an application programming interface (API) associated with the PPU driver, for computing physics simulation data;
transmitting commands for computing the physics simulation data via the PPU driver to a PPU control engine (PCE) within the PPU, wherein the PCE controls the overall operation of the PPU by allocating memory resources and distributing the commands to a Floating Point Engine (FPE) for processing within a vector processor included in the FPE and adapted to perform multiple, parallel floating point operations to generate the physics simulation data, and wherein the multiple, parallel floating point operations are specified by a very long instruction word (VLIW) that is issued to the FPE by the PCE;
transmitting physics data from the host memory to the PPU via the PPU driver;
computing the physics simulation data by calling microcode routines on the physics data; and
receiving the physics simulation data from the PPU and storing the physics simulation data in the host memory via the PPU driver.

2. The method of claim 1, further comprising:
storing the PPU driver and the API in the host.

3. The method of claim 1, wherein the physics simulation data is communicated from the PPU to the host via at least one physical interface selected from a group of physical interfaces consisting of: USB, USB2, Firewire, PCI, PCI-X, PCIExpress, and Ethernet.

4. The method of claim 1, wherein the PPU comprises:
an internal PPU memory; and
a Data Movement Engine (DME) performing data movement operations, wherein the method further comprises:
communicating a command from the PCE to the DME;
in response to the command, moving data from the host memory and storing the data in the internal PPU memory.

5. The method of claim 4, further comprising:
allowing the FPE access to the data stored in the internal PPU memory.

6. The method of claim 5, wherein the internal PPU memory comprises multiple banks, and wherein steps of moving data from the host memory to the internal PPU memory and allowing the FPE access to the data moved into the internal PPU memory comprise steps in a multithreading data computation technique.

7. The method of claim 1, wherein the host further comprises a Graphics Processing Unit (GPU), and the method further comprises:
storing a game engine in the host;
storing an effects engine in the host; and
wherein the PPU driver is callable by at least one of the main game program, the game engine, and the effects engine.

8. The method of claim 7, wherein the operation of the PPU is initiated only by means of the PPU driver.

9. The method of claim 1, wherein the physics simulation data comprises data associated with at least one of; a rigid body contact, a rigid body collision, and rigid body dynamics.

10. The method of claim 1, wherein the physics simulation data comprises data associated with a collision detection.

11. The method of claim 1, wherein the physics simulation data comprises data associated with at least one of; simulated physical forces, simulated physical constraints, and state vectors.

12. The method of claim 1, wherein the physics simulation data comprises data associated with a simulated particle mesh related to at least one of animated cloth, smoke, water, fog and fire.

13. A method, comprising:
executing a main game program on a game system comprising a host and a Physics Processing Unit (PPU) coupled to the host, wherein the host comprises a Central Processing Unit (CPU) and a host memory;
calling a PPU driver from the main game program;
initiating operation of the PPU, via an application programming interface (API) associated with the PPU driver, for computing physics simulation data;
transmitting commands for computing the physics simulation data via the PPU driver to a PPU control engine (PCE) within the PPU, wherein the PCE controls the overall operation of the PPU by allocating memory resources and distributing the commands to a Floating Point Engine (FPE) for processing within a vector processor included in the FPE and adapted to perform multiple, parallel floating point operations to generate the physics simulation data, and wherein the multiple, parallel floating point operations are specified by a very long instruction word (VLIW) that is issued to the FPE by the PCE;
transmitting physics data from the host memory to the PPU via the PPU driver;
computing the physics simulation data by calling microcode routines on the physics data; and
receiving the physics simulation data from the PPU and storing the physics simulation data in the host memory via the PPU driver.

14. The method of claim 13, further comprising:
communicating the physics simulation data from the PPU to the CPU.

15. The method of claim 14, wherein physics simulation data is communicated from the PPU to the CPU according to a protocol selected from a group of data communication protocols defined in relation to USB, USB2, Firewire, PCI, PCI-XI, PCIExpress, and Ethernet.

16. The method of claim 13, further comprising:
executing a game engine routine on the host; and
calling the PPU driver from the game engine routine.

17. The method of claim 13, wherein the host further comprises a Graphics Processing Unit (GPU), and the method further comprises:
executing an effects engine routine associated with the GPU; and
calling the PPU driver from the effects engine routine.

18. The method of claim 13, wherein the physics simulation data comprises data associated with at least one of: a rigid body contact, a rigid body collision, and rigid body dynamics.

19. The method of claim 13, wherein the physics simulation data comprises data associated with a collision detection.

20. The method of claim 13, wherein the physics simulation data comprises data associated with at least one of; simulated physical forces, simulated physical constraints, and state vectors.

21. The method of claim 13, wherein the physics simulation data comprises data associated with a simulated particle mesh related to at least one of animated cloth, smoke, water, fog and fire.

22. A method of implementing a system for generating physics simulation data for the purpose of constructing a physically realistic animation within the context of a game program, the method comprising:
    providing a hardware platform adapted to run the game program, wherein the hardware platform includes at least a memory and a general purpose microprocessor, wherein the memory stores a PPU driver;
    providing a dedicated, hardware based Physics Processing Unit (PPU) adapted to generate the physics simulation data, wherein the operation of the PPU is initiated when the PPU driver is called by the game program via an application programming interface (API) associated with the PPU driver, and wherein the PPU driver transmitting commands for computing the physics simulation data via the PPU driver to a PPU control engine (PCE) within the PPU, and wherein the PCE controls the overall operation of the PPU by allocating memory resources and distributing the commands to a Floating Point Engine (FPE) for processing within a vector processor included in the FPE and adapted to perform multiple, parallel floating point operations to generate the physics simulation data, and wherein the multiple, parallel floating point operations are specified by a very long instruction word (VLIW) that is issued to the FPE by the PCE;
    computing the physics simulation data by calling microcode; and
    transmitting the physics simulation data to the game program via the PPU driver.

23. The method of claim 22, wherein the step of providing a dedicated, hardware based PPU further comprises:
    connecting an expansion board comprising the PPU within the hardware platform.

24. The method of claim 23, wherein the expansion board is an AGP or a PCI-Express board.

25. The method of claim 22, wherein the step of providing a dedicated, hardware based PPU further comprises:
    providing a physical data communication path between the general purpose microprocessor and the PPU within the hardware platform.

26. The method of claim 22, further comprising:
    providing a dedicated, hardware based Graphics Processing Unit (GPU) adapted to generate graphics data for use within the context of the game program.

27. The method of claim 26, wherein the step of providing a dedicated, hardware based PPU further comprises connecting a first expansion board comprising:
    the PPU within the hardware platform; and
    wherein the step of providing a dedicated, hardware based GPU further comprises connecting a second expansion board comprising the GPU within the hardware platform.

28. The method of claim 26, wherein the step of providing a dedicated, hardware based PPU and the step of providing a dedicated, hardware based GPU are both accomplished by connecting a single expansion board comprising the PPU and GPU within the hardware platform.

29. The method of claim 28, wherein the PPU and GPU are capable of communicating data across a physical connection on the single expansion card.

30. The method of claim 28, wherein the expansion board is an AGP or a PCI-Express board.

* * * * *